US 10,543,744 B2

(12) United States Patent
Kurokawa

(10) Patent No.: US 10,543,744 B2
(45) Date of Patent: Jan. 28, 2020

(54) WORKING VEHICLE

(71) Applicant: YANMAR CO., LTD., Osaka-shi, Osaka (JP)

(72) Inventor: Yoshiaki Kurokawa, Osaka (JP)

(73) Assignee: YANMAR CO., LTD., Osaka (JP)

( * ) Notice: Subject to any disclaimer, the term of this patent is extended or adjusted under 35 U.S.C. 154(b) by 83 days.

(21) Appl. No.: 15/362,562

(22) Filed: Nov. 28, 2016

(65) Prior Publication Data

US 2017/0072786 A1    Mar. 16, 2017

Related U.S. Application Data

(63) Continuation of application No. PCT/JP2015/063890, filed on May 14, 2015.

(30) Foreign Application Priority Data

May 29, 2014  (JP) ................................. 2014-111314

(51) Int. Cl.
*B60K 13/04* (2006.01)
*B60K 11/04* (2006.01)
(Continued)

(52) U.S. Cl.
CPC .............. *B60K 13/04* (2013.01); *B60K 11/04* (2013.01); *B60K 11/08* (2013.01); *B62D 25/12* (2013.01);
(Continued)

(58) Field of Classification Search
CPC ......... B62D 25/10; B62D 25/12; B60K 13/04
See application file for complete search history.

(56) References Cited

U.S. PATENT DOCUMENTS 6,092,818 A * 7/2000 Shute ..................... B62D 25/10
                                              180/69.21
6,206,122 B1 * 3/2001 Boothman ............. B62D 25/10
                                              180/89.17
(Continued)

FOREIGN PATENT DOCUMENTS

CN      100999903 A     7/2007
DE      4243795 A1      7/1994
(Continued)

OTHER PUBLICATIONS

Office Action dated Jun. 13, 2019 for KR Application 10-2016-7030722.
(Continued)

*Primary Examiner* — James A Shriver, II
*Assistant Examiner* — Vaughn Coolman
(74) *Attorney, Agent, or Firm* — Norton Rose Fulbright US LLP

(57) ABSTRACT

The working vehicle includes an engine installed in a front portion of a traveling machine body, and a post-processing device configured to purify exhaust gas from the engine. The post-processing device is mounted on an upper side of the engine. The engine and the post-processing device are covered with a hood. A hood shield plate is disposed on a rear surface side of the hood and covers at least the post-processing device from a rear surface. A heat insulating layer is formed between an operating seat disposed on a rear side of the hood and the hood shield plate.

18 Claims, 23 Drawing Sheets

(51) Int. Cl.
 *B60K 11/08* (2006.01)
 *B62D 25/12* (2006.01)
(52) U.S. Cl.
 CPC ..... *B60Y 2200/221* (2013.01); *B60Y 2306/05* (2013.01); *B60Y 2400/432* (2013.01)

(56) References Cited

U.S. PATENT DOCUMENTS

| | | | | |
|---|---|---|---|---|
| 7,464,782 | B2* | 12/2008 | Hirakawa | B60K 15/063 180/89.12 |
| 7,475,750 | B2* | 1/2009 | Tokuhara | B62D 25/10 180/69.2 |
| 7,503,306 | B2* | 3/2009 | Knockl | B60K 11/06 123/198 E |
| 7,735,594 | B2* | 6/2010 | Hidaka | B62D 49/06 180/311 |
| 7,814,963 | B2* | 10/2010 | Adamson | B60K 11/04 123/41.31 |
| 8,100,212 | B2* | 1/2012 | Sawai | B62D 25/14 180/69.2 |
| 8,157,042 | B2* | 4/2012 | Fujiki | A01B 51/026 180/312 |
| 8,572,954 | B2* | 11/2013 | DeYoung | F01N 13/18 60/311 |
| 9,033,081 | B1* | 5/2015 | Yamagoe | B60K 11/02 180/68.1 |
| 9,073,581 | B2* | 7/2015 | Aoyama | B60K 13/04 |
| 9,222,383 | B2* | 12/2015 | Togo | F01N 13/1811 |
| 9,347,350 | B2* | 5/2016 | Ozaki | F01N 3/08 |
| 9,499,045 | B2* | 11/2016 | Sawai | B60K 15/063 |
| 9,579,968 | B2* | 2/2017 | Rizzon | B60K 11/08 |
| 2005/0211487 | A1* | 9/2005 | Obe | B60K 11/08 180/69.21 |
| 2007/0289570 | A1* | 12/2007 | Knockl | B60K 11/06 123/198 E |
| 2008/0011532 | A1 | 1/2008 | Ayabe | |
| 2008/0078525 | A1* | 4/2008 | Adamson | B60K 11/04 165/44 |
| 2008/0079281 | A1 | 4/2008 | Aoyama et al. | |
| 2009/0127815 | A1* | 5/2009 | Tani | B62D 49/02 280/164.1 |
| 2009/0242302 | A1* | 10/2009 | Fujiki | A01B 51/026 180/89.12 |
| 2010/0089674 | A1* | 4/2010 | Oka | B60K 11/04 180/68.1 |
| 2010/0326755 | A1* | 12/2010 | Husson | B60K 11/04 180/68.1 |
| 2011/0203864 | A1* | 8/2011 | Ryczek | B62D 25/10 180/69.24 |
| 2013/0233432 | A1* | 9/2013 | Tanaka | F16L 9/19 138/114 |
| 2014/0020972 | A1* | 1/2014 | Masumoto | B60K 11/06 180/309 |
| 2014/0151139 | A1* | 6/2014 | Rizzon | B60K 11/08 180/68.1 |
| 2014/0251713 | A1* | 9/2014 | Aoyama | B60K 13/04 180/309 |
| 2015/0114747 | A1* | 4/2015 | Kiyokawa | B60K 13/04 180/309 |
| 2016/0031486 | A1* | 2/2016 | Shoen | B62D 25/12 180/68.3 |
| 2016/0053463 | A1* | 2/2016 | Kamimae | E02F 9/0866 180/309 |
| 2016/0068058 | A1* | 3/2016 | Kamimae | B60K 11/08 180/309 |
| 2016/0237646 | A1* | 8/2016 | Yabe | B60K 11/04 |

FOREIGN PATENT DOCUMENTS

| | | |
|---|---|---|
| JP | 1986-32510 U | 2/1986 |
| JP | 2-41929 A | 2/1990 |
| JP | 3-292275 A | 12/1991 |
| JP | 2000-34820 A | 2/2000 |
| JP | 2000-043820 A | 2/2000 |
| JP | 2002-19647 A | 1/2002 |
| JP | 2002-302067 A | 10/2002 |
| JP | 2006-62425 A | 3/2006 |
| JP | 2008-87491 A | 4/2008 |
| JP | 2010-042779 A | 2/2010 |
| JP | 2010-163036 A | 7/2010 |
| JP | 2011-047390 A | 3/2011 |
| JP | 2011-126342 A | 6/2011 |
| JP | 2012-201158 A | 10/2012 |
| JP | 2013-018325 A | 1/2013 |
| JP | 2013-116692 A | 6/2013 |
| JP | 2014-19358 A | 2/2014 |
| JP | 2014-031053 A | 2/2014 |
| JP | 5435965 B2 | 3/2014 |
| JP | 2014227779 A * | 12/2014 |

OTHER PUBLICATIONS

Office Action dated Jun. 20, 2018 for CN Application 201580028403.X.

Search Report dated Dec. 11, 2017 for EP Application 15799171.2.

* cited by examiner

WORKING VEHICLE

CROSS-REFERENCE TO RELATED APPLICATIONS

The present application is a continuation application of International Application No. PCT/JP2015/063890, filed May 14, 2015, which claims priority to Japanese Patent Application No. 2014-111314, filed May 29, 2014. The contents of these applications are incorporated herein by reference in their entirety.

BACKGROUND OF THE INVENTION

The invention according to the present application relates to a working vehicle.

Recently, enactment of strict emission regulation on diesel engines has led to increased demands for installing a post-processing device, such as an exhaust gas purifying device, in a farm work machine, a construction machine, a vessel, and the like including the diesel engine. The post-processing device executes purification processing for air pollutants in exhaust gas. In some conventional working vehicles, such as a tractor, the exhaust gas purifying device is disposed together with the diesel engine in an engine compartment below the hood, to be installed in the vehicle (see Japanese Unexamined Patent Application Publication No. 2013-116692).

In the working vehicle such as a tractor, a pair of fuel tanks, storing fuel supplied to the engine, are respectively disposed on left and right sides of a vehicle body to make space for the engine, a transmission, and the like (see Japanese Unexamined Patent Application Publication No. 2010-042779).

SUMMARY OF THE INVENTION

When the diesel engine provided with the exhaust gas treatment device described above is employed in the working vehicle such as a tractor, not only the diesel engine and the exhaust gas treatment device but also a radiator, a battery, and electronic components for the exhaust gas treatment device need to be crammed in a small and limited installation space.

In the installation space of the working vehicle, when the diesel engine is driven, the diesel engine emits heat, and thus temperature of the diesel engine itself as well as the exhaust gas purifying device becomes extremely high. Thus, the temperature in the engine compartment needs to be adjusted so that adverse effect of the heat emitted from the diesel engine and the exhaust gas treatment device can be prevented. All things considered, appropriate arrangement and cooling structures need to be pursued. Furthermore, heating of a driver's seat, disposed on the rear side of the engine compartment, needs to be reduced or else, comfort of an operator in the cabin is compromised.

When the post-processing device such as the exhaust gas purifying device is installed, a large engine compartment space is required. Thus, a hood becomes large, requiring a highly rigid opening/closing structure. The load is especially concentrated on a fulcrum position when the hood is opened, and thus a highly rigid rotatably supporting mechanism is preferably provided. Furthermore, the inside of the engine compartment is required to be easily accessed for performing a maintenance work and the like.

A technical object of the invention according to the present application is to provide an improved working vehicle in view of the current situation described above.

The invention according to the present application is a working vehicle including: an engine installed in a front portion of a traveling machine body; and a post-processing device configured to purify exhaust gas from the engine. The post-processing device is mounted on an upper side of the engine. The engine and the post-processing device are covered with a hood. A hood shield plate is disposed on a rear surface side of the hood and covers at least the post-processing device from a rear surface. A heat insulating layer is formed between an operating seat disposed on a rear side of the hood and the hood shield plate.

In the working vehicle according to the invention according to the present application, the post-processing device may be disposed in parallel with an output shaft of the engine. The hood shield plate may include: a first shield surface that is disposed on one side of the hood and covers a rear side of the post-processing device; a second shield surface extending forward from a side edge of the first shield surface; and a third shield surface that extends toward another side of the hood from a front edge of the second shield surface. On the rear surface of the hood, an open space may be provided between the third shield surface of the hood shield plate and the other side of the hood, and an exhaust pipe connected to an exhaust side of the post-processing device may extend toward the rear side of the hood.

In the working vehicle according to the invention according to the present application, the hood shield plate may have recesses and protrusions formed at a predetermined interval to block sound generated from an engine compartment below the hood.

In the working vehicle, the hood shield plate covering a rear side of the engine may be fixed to the traveling machine body to be disposed on the rear surface of the hood. A heat shield plate may be disposed between the hood and the post-processing device. The hood may pivot about an upper end position of the hood shield plate to be opened and closed.

In this configuration, the hood shield plate may be disposed while being separated from a front side of the operating seat disposed on the rear side of the hood. Beam frames in parallel with the traveling machine body may be disposed on both sides on a front surface of the hood shield plate. The hood may include: a hinge having a pivoting portion connected to a rear end position of the hood; and a damper that has one end connected to a front side of the hood and makes a telescopic movement. A fixed portion of the hinge may be connected to a hood supporting portion provided on an upper edge side of the hood shield plate. Another end of the damper may be rotatably supported by the beam frame.

In the working vehicle, a radiator for cooling the engine with water and a cooling fan for cooling the engine and the radiator with air are provided. The cooling fan may be disposed on a front surface side of the engine. The radiator may be disposed on a front side of the cooling fan. The post-processing device may be mounted on the upper side of the engine. The radiator, the cooling fan, the engine, and the post-processing device may be covered with the hood. Cooling air may be taken into the hood through a front grille formed on the front surface of the hood, by driving the cooling fan. Openings may be formed in both left and right side portions of the hood. Shielding plates may be disposed at positions close to left and right side portions of the radiator.

In this configuration, the radiator may stand on a front portion of the traveling machine body. A fan shroud surrounding the cooling fan may be attached to a rear surface side of the radiator. When the hood is closed, the shielding plates provided to the hood may be in contact with both left and right side portions of the fan shroud. An opening may be further formed on the ceiling portion of the hood. The fan shroud may have an upper surface provided with an upper shielding portion that extends in a left and right direction and left and right surfaces provided with a pair of left and right side shielding portions extending in an upper and lower direction. When the hood is closed, the upper shielding portion may be disposed close to a back surface of the hood ceiling portion, and the side shielding portions may be in contact with the shielding plates of the hood. The openings on the ceiling portion and the both left and right side portions of the hood may be disposed more on a front side than the fan shroud.

In the working vehicle, engine covers formed of a porous plate may be provided on left and right rear lower sides of the hood. The engine cover may have an upper end position positioned below the post-processing device. Thus, air heated by the engine and the post-processing device may be discharged outside, while achieving a high temperature maintaining effect for the post-processing device with the hood, so that a regeneration operation can be performed under high temperature.

In the embodiment of the invention according to the present application, heat from an engine compartment below the hood is shielded by the hood shield plate. The operating seat can be prevented from being heated by exhaust heat from the engine compartment. Thus, an operator on the operating seat can comfortably operate the vehicle without being affected by exhaust heat from the engine and the post-processing device. The operating seat and the hood are separated from each other. Thus, the hood may have a large outer dimension and can still be sufficiently opened. As described above, even when the engine compartment incorporates a heat emitting member such as the post-processing device, with a large volume achieved in the hood, the hood can be less affected by heat emitted from the post-processing device.

The hood shield plate has first to third shield surfaces bent in a crank shape. Thus, rear and side portions of the post-processing device as the heat emitting member shield are shielded, whereby the operating seat on the rear side of the engine compartment can be less affected by the heat. An open space is provided between the third shield surface that is relatively less affected by heat and the hood. Thus, a tail pipe can be disposed at a position less likely to involve an operation of getting ON/OFF the vehicle by the operator. The third shield surface that is relatively less affected by heat is positioned on the front side. Thus, components such as a hydraulic pump can be disposed in a large space extending toward the operating seat.

The hood shield plate is provided with the recesses and the protrusions. Thus, noise generated from the engine in the engine compartment can be attenuated by the recesses and the protrusions of the hood shield plate so as not to be transmitted to the operating seat.

In the embodiment of the invention according to the present application, the heat shield plate is disposed above the post-processing device, whereby the hood can be prevented from being heated by heat emitted from the post-processing device and the engine. The space is formed between the hood and the heat shield plate. Thus, the post-processing device can be operated in a high temperature environment, while insulating the inside of the engine compartment below the heat shield plate from outer air. The operating seat can be prevented from being heated by the heat emitted from the engine compartment, with the heat in the engine compartment under the hood shielded by the hood shield plate. With a gap provided between the hood shield plate and the heat shield plate, the heat is less likely to accumulate in the engine compartment. Thus, the heat damage on the post-processing device itself, the hood, and the like can be prevented.

In the embodiment of the invention according to the present application, the hood pivots about the upper end position of the hood shield plate to be opened and closed. Thus, the hood can be largely opened rearward, so that the operator can easily access inside the engine compartment. All things considered, the operator can not only perform a maintenance work easily but can also perform the maintenance safely and the like by being prevented from coming into contact with the hood.

In the embodiment of the invention according to the present application, the heat in the engine compartment below the hood is shielded by the hood shield plate. Thus, the operating seat can be prevented from being heated by heat emitted from the engine compartment, whereby the operator on the operating seat can comfortably operate the vehicle without being affected by exhaust heat from the engine and the post-processing device. The operating seat and the hood are separated from each other. Thus, the hood may have a large outer dimension and can still be sufficiently opened. As described above, even when the engine compartment incorporates a heat emitting member such as the post-processing device, with a large volume achieved in the hood, the hood can be less affected by heat emitted from the post-processing device.

In the embodiment of the invention according to the present application, the engine covers having an entire surface in a porous form are disposed on both sides of the engine. Thus, the air heated by the engine and the post-processing device can be discharged outside. The engine cover has an upper end position positioned below the post-processing device. Thus, a high temperature maintaining effect for the post-processing device can be achieved with the hood, so that a regeneration operation can be performed under high temperature.

In the embodiment of the invention according to the present application, the heat in the engine compartment below the hood is shielded by the hood shield plate. Thus, the operating seat can be prevented from being heated by heat emitted from the engine compartment, whereby the operator on the operating seat can comfortably operate the vehicle without being affected by exhaust heat from the engine and the post-processing device. The space is formed between the hood and the heat shield plate. Thus, the post-processing device can be operated in a high temperature environment, while insulating the inside of the engine compartment below the heat shield plate from outer air.

In the embodiment of the invention according to the present application, a flow of the cooling air taken in through the openings on the side of the radiator toward the rear side is shielded by the shielding plate, so that the cooling air can be sent to the front surface side of the radiator. Thus, an amount of cooling air passing through the radiator can be increased, whereby the radiator can efficiently be cooled by air. The cooling air is efficiently blown to the engine by the cooling fan surrounded by the fan shroud. Thus, a relaxed heat environment can be achieved around the engine even when the post-processing device that serves as a high temperature heat source is provided.

In the embodiment of the invention according to the present application, when the hood is closed, the shielding plate and the side shielding portions are positioned on the rear side of the opening on the side surface, and the upper shielding portion is positioned on the rear side of the opening of the ceiling portion. Thus, a large amount of cooling air can be taken into the radiator. Thus, a high effect of cooling various cooling members such as the radiator and an intercooler disposed on the front side of the engine compartment can be achieved. A large amount of cooling air can be taken in by the cooling fan surrounded by the fan shroud. Thus, the cooling air can be supplied to the engine that serves as the heat emitting member, whereby an excellent heat balance can be achieved in the engine compartment.

DESCRIPTION OF THE EMBODIMENTS

Figure 1:
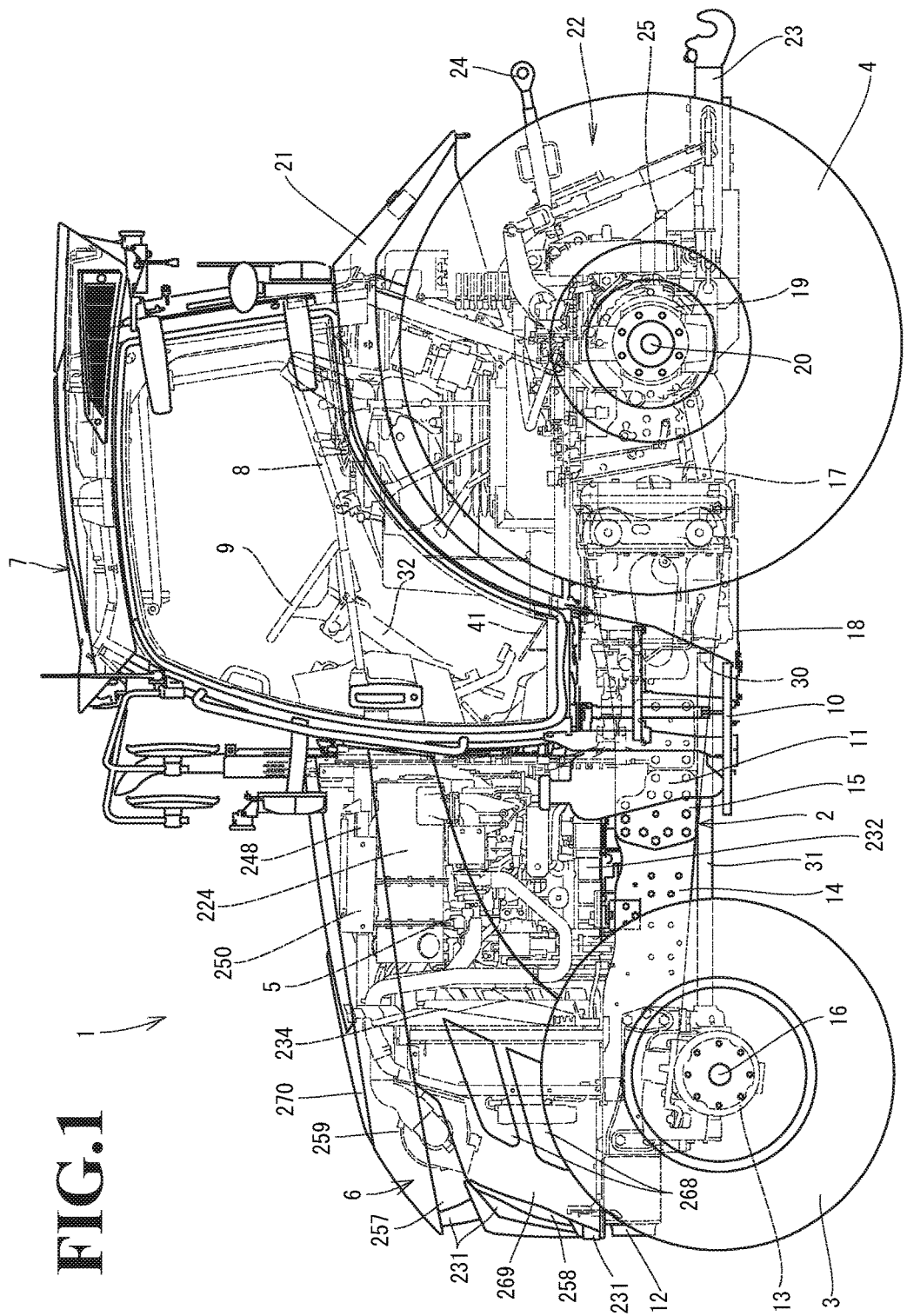
FIG. 1 is as a left side view of a tractor.
Figure 2:
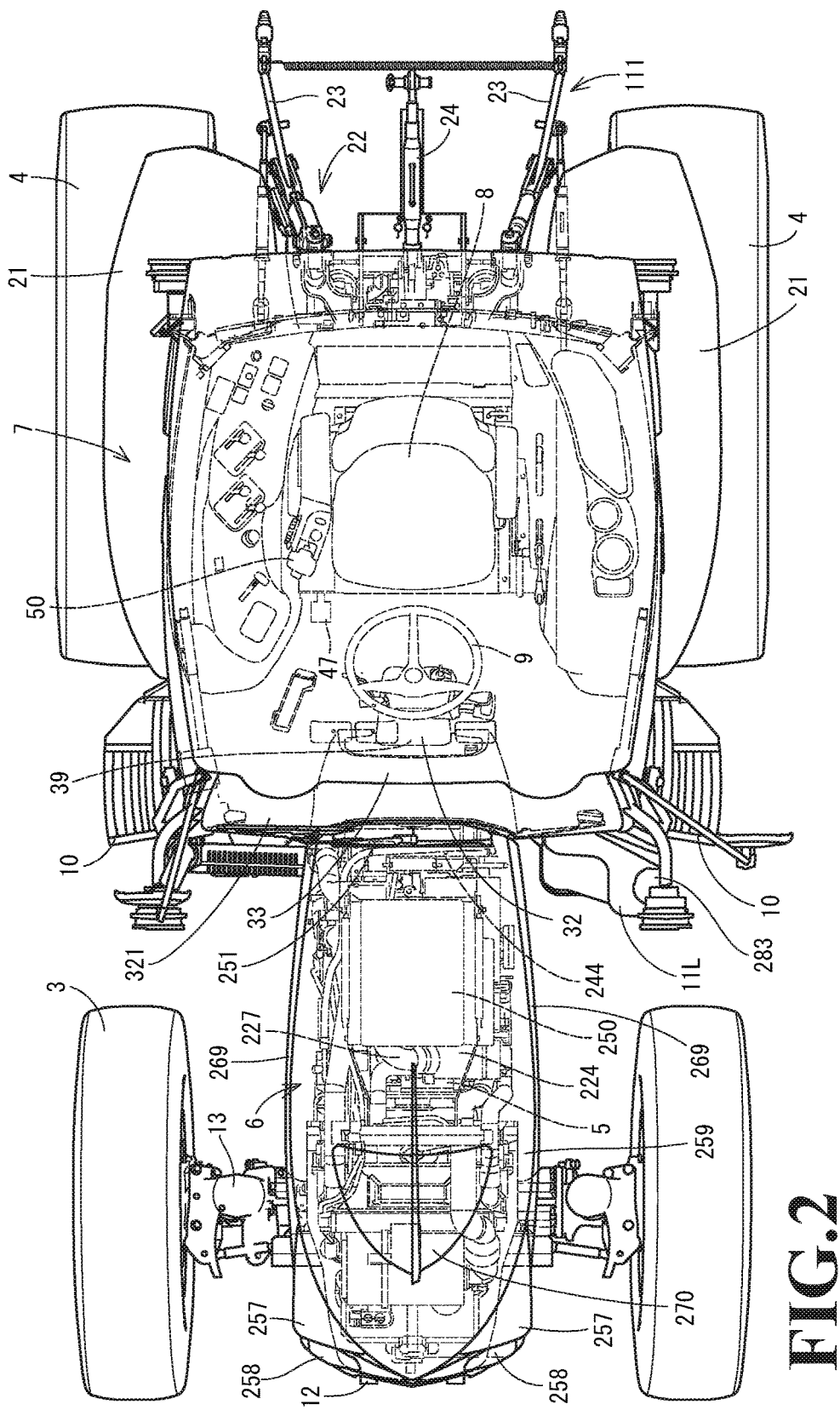
FIG. 2 is a plan view of the tractor.
Figure 3:
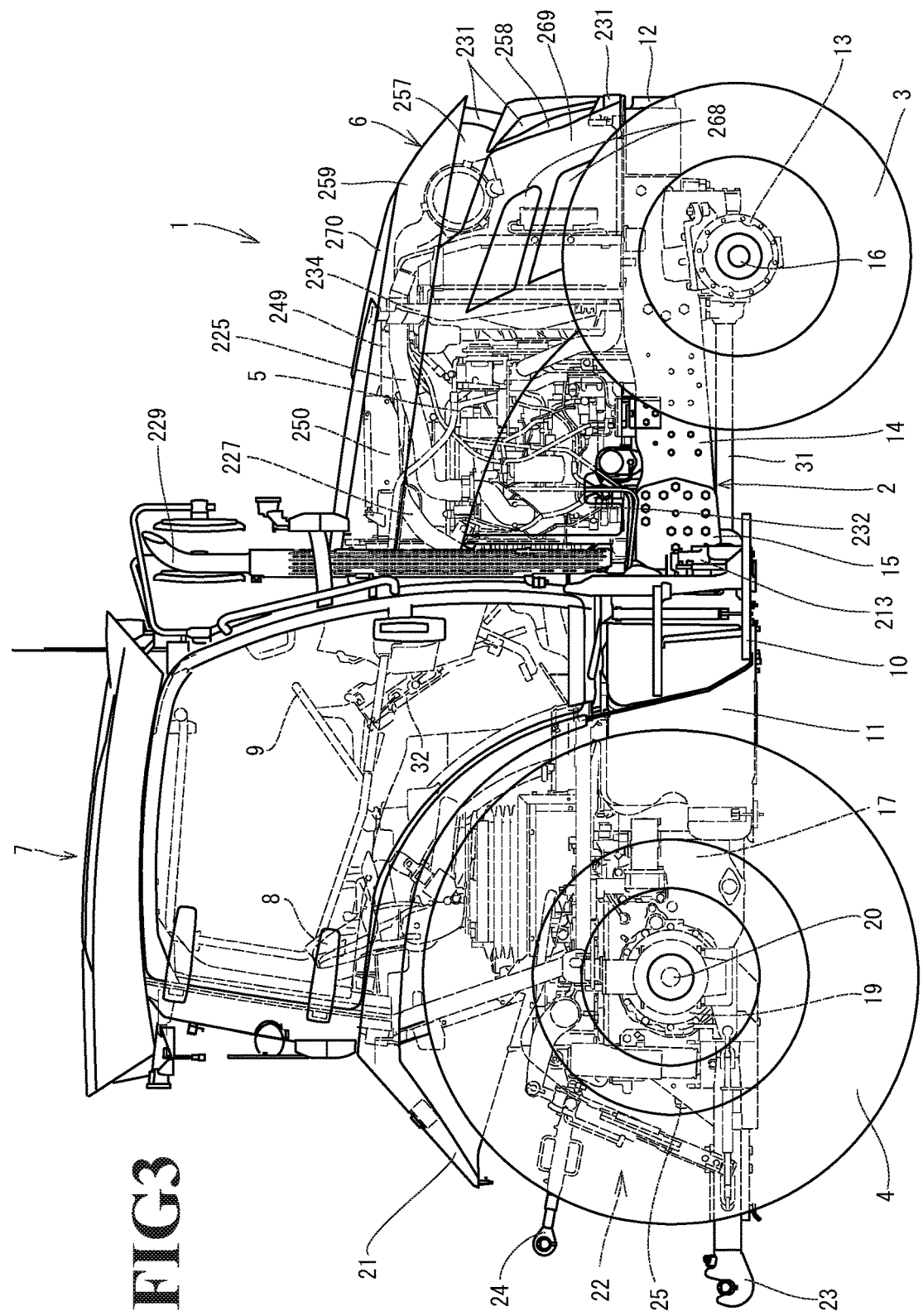
FIG. 3 is a right side view of the tractor.
Figure 4:
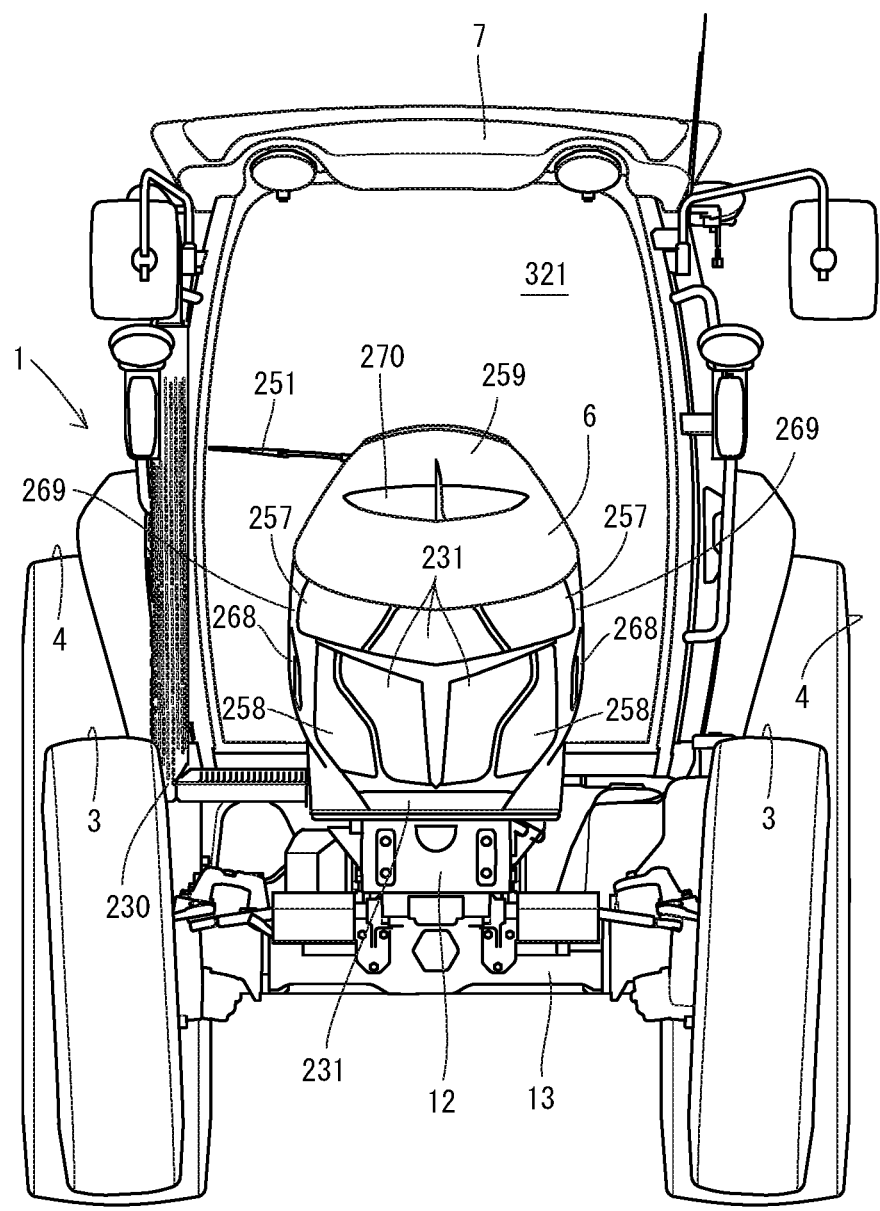
FIG. 4 is a front view of the tractor.
Figure 5:
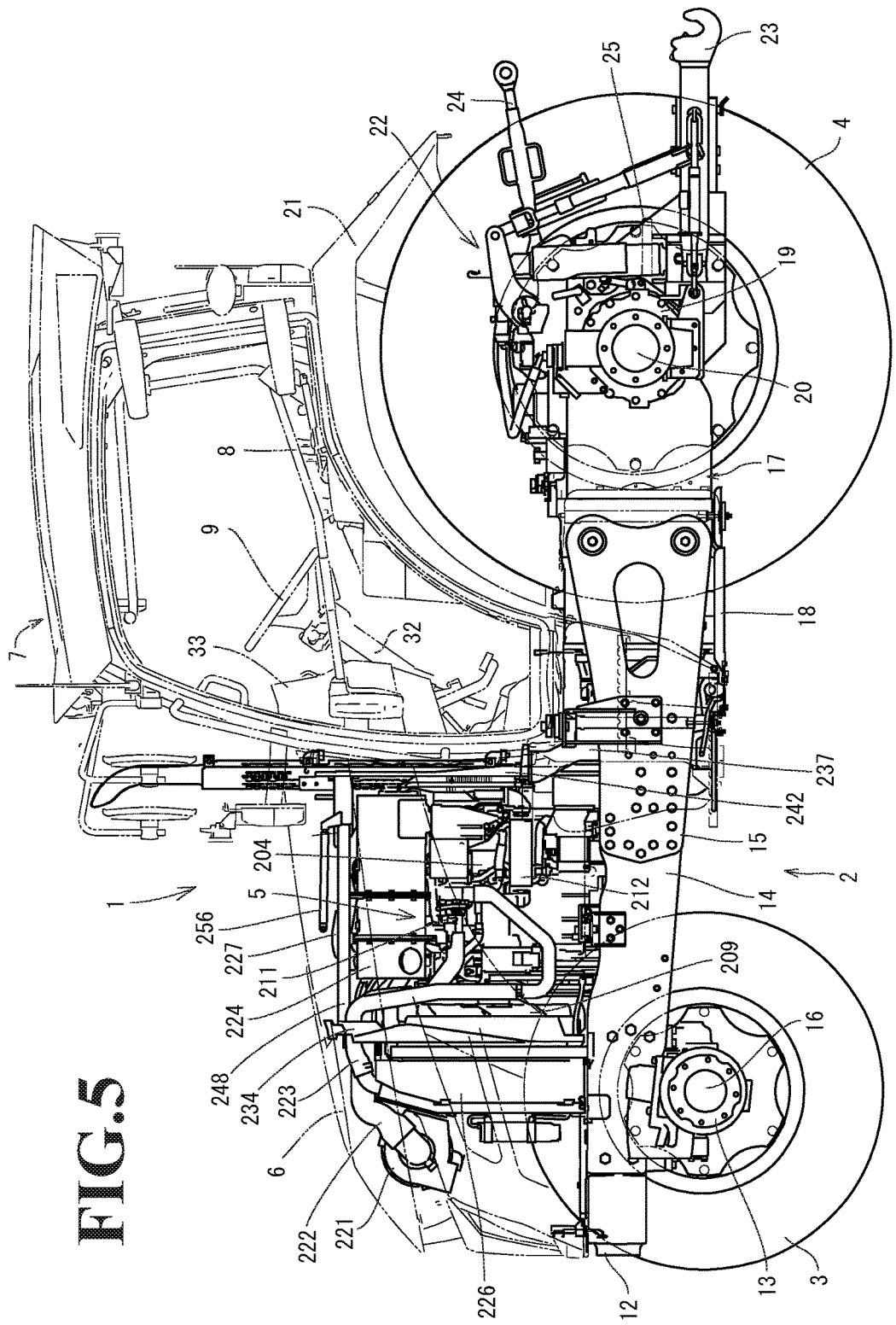
FIG. 5 is a diagram illustrating a left side surface of a traveling machine body.
Figure 6:
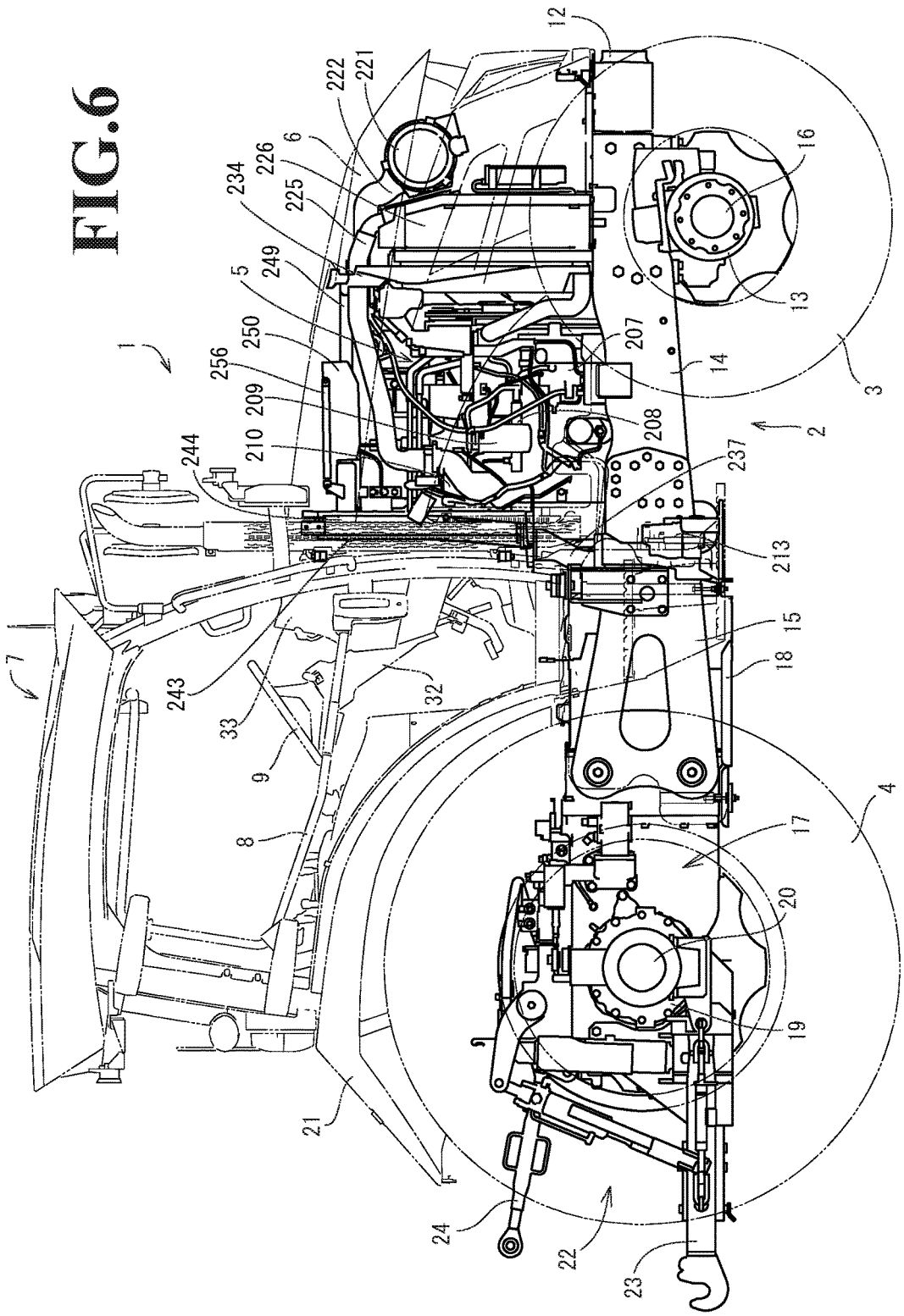
FIG. 6 is a diagram illustrating a right side surface of the traveling machine body.
Figure 7:
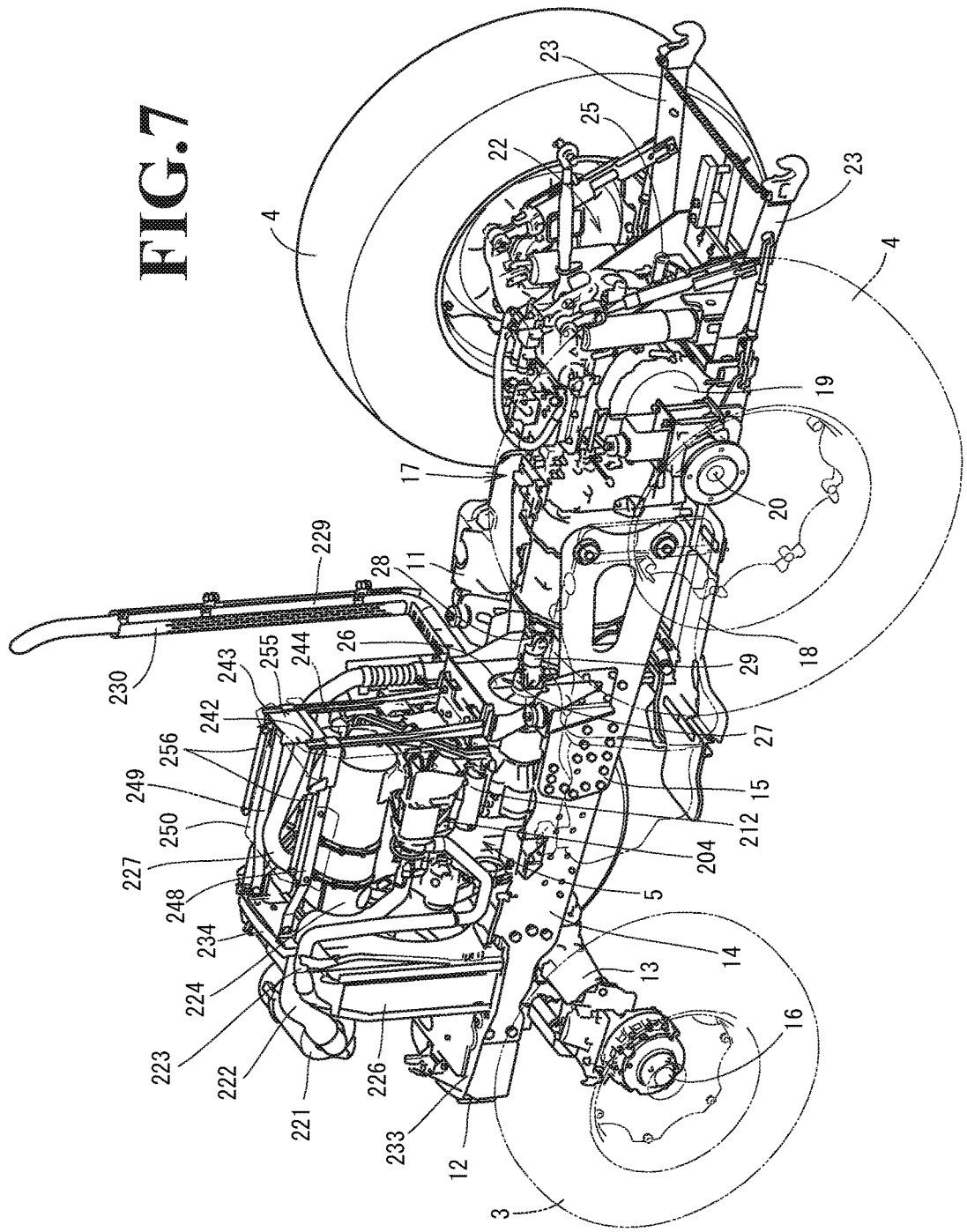
FIG. 7 is a perspective view of the traveling machine body as diagonally viewed from a left and rear side.
Figure 8:
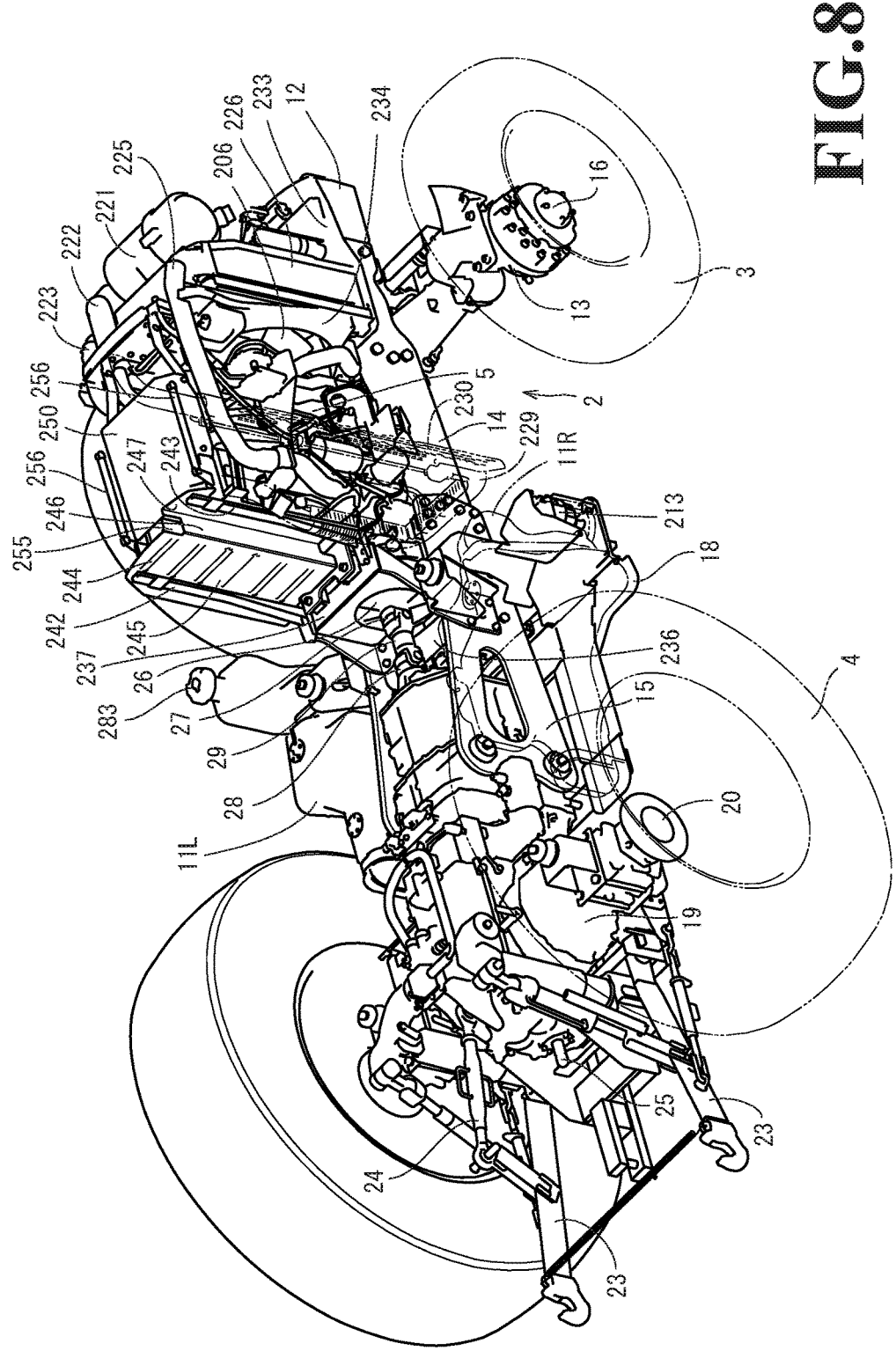
FIG. 8 is a perspective view of the traveling machine body as diagonally viewed from a right and rear side.
Figure 9:
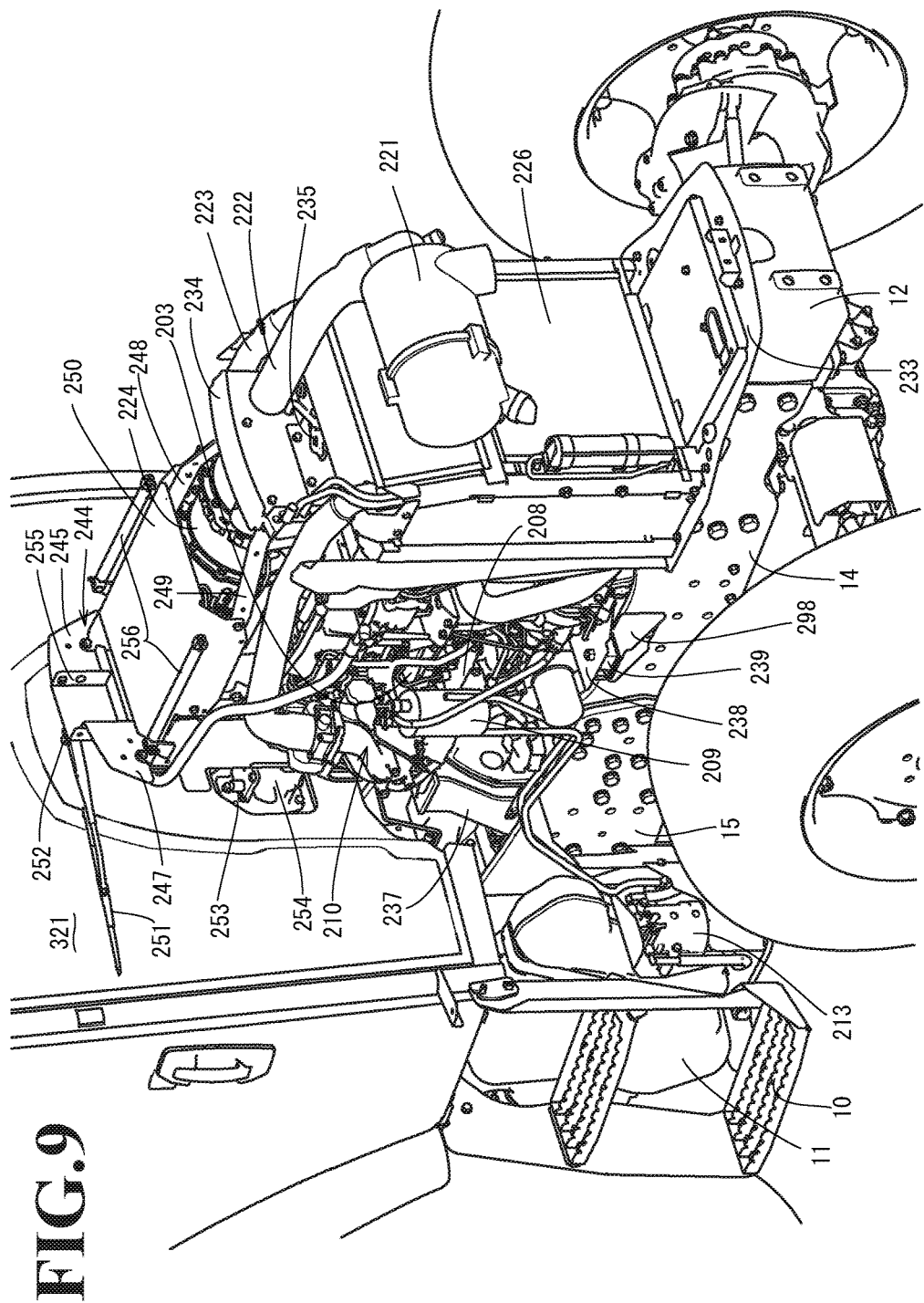
FIG. 9 is a perspective view illustrating a hood rear surface structure as viewed from a side of a cabin.
Figure 10:
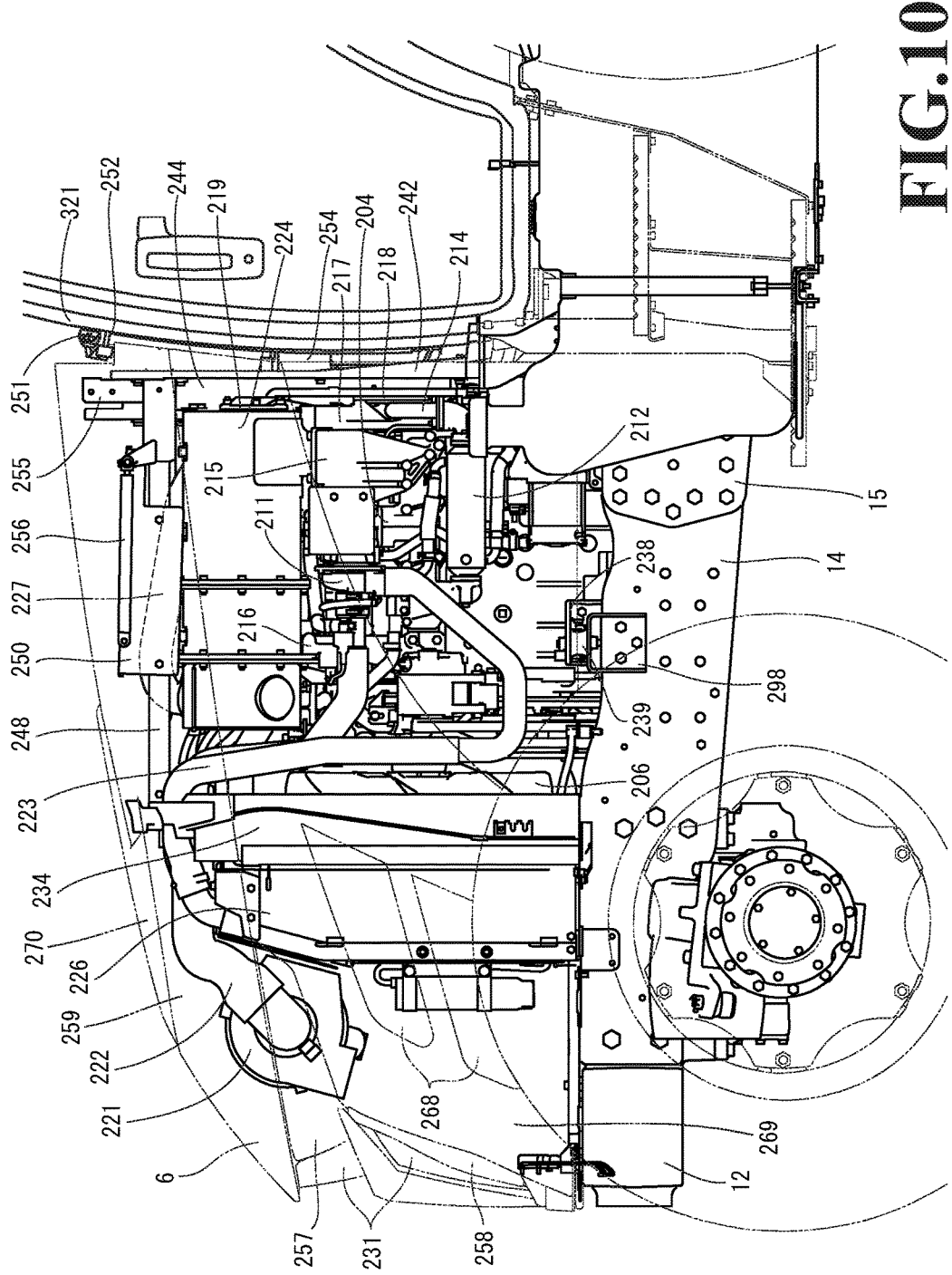
FIG. 10 is an enlarged view of a left side surface of the tractor.
Figure 11:
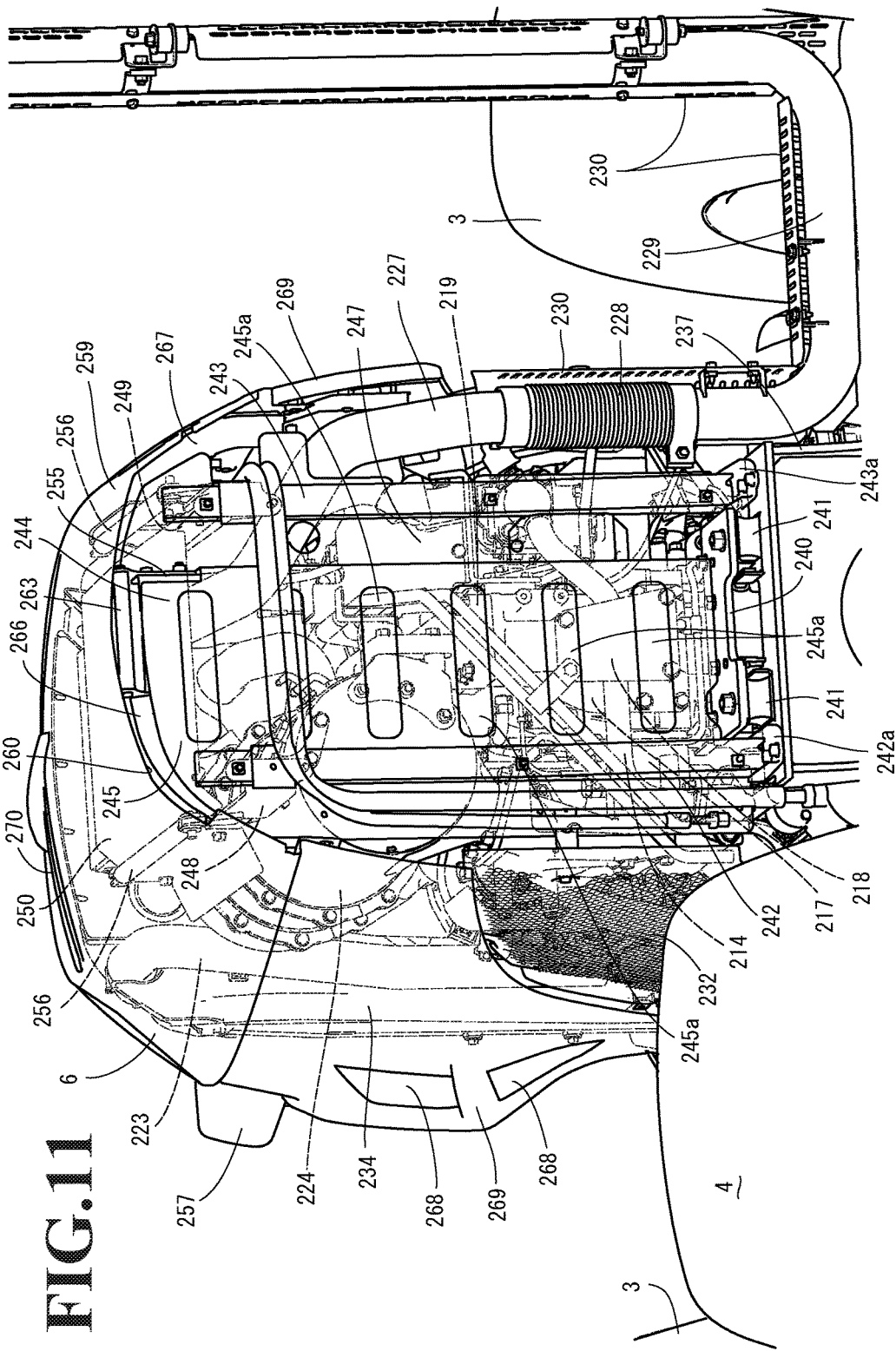
FIG. 11 is a perspective view illustrating a structure of an engine compartment as diagonally viewed from the left rear side.
Figure 12:
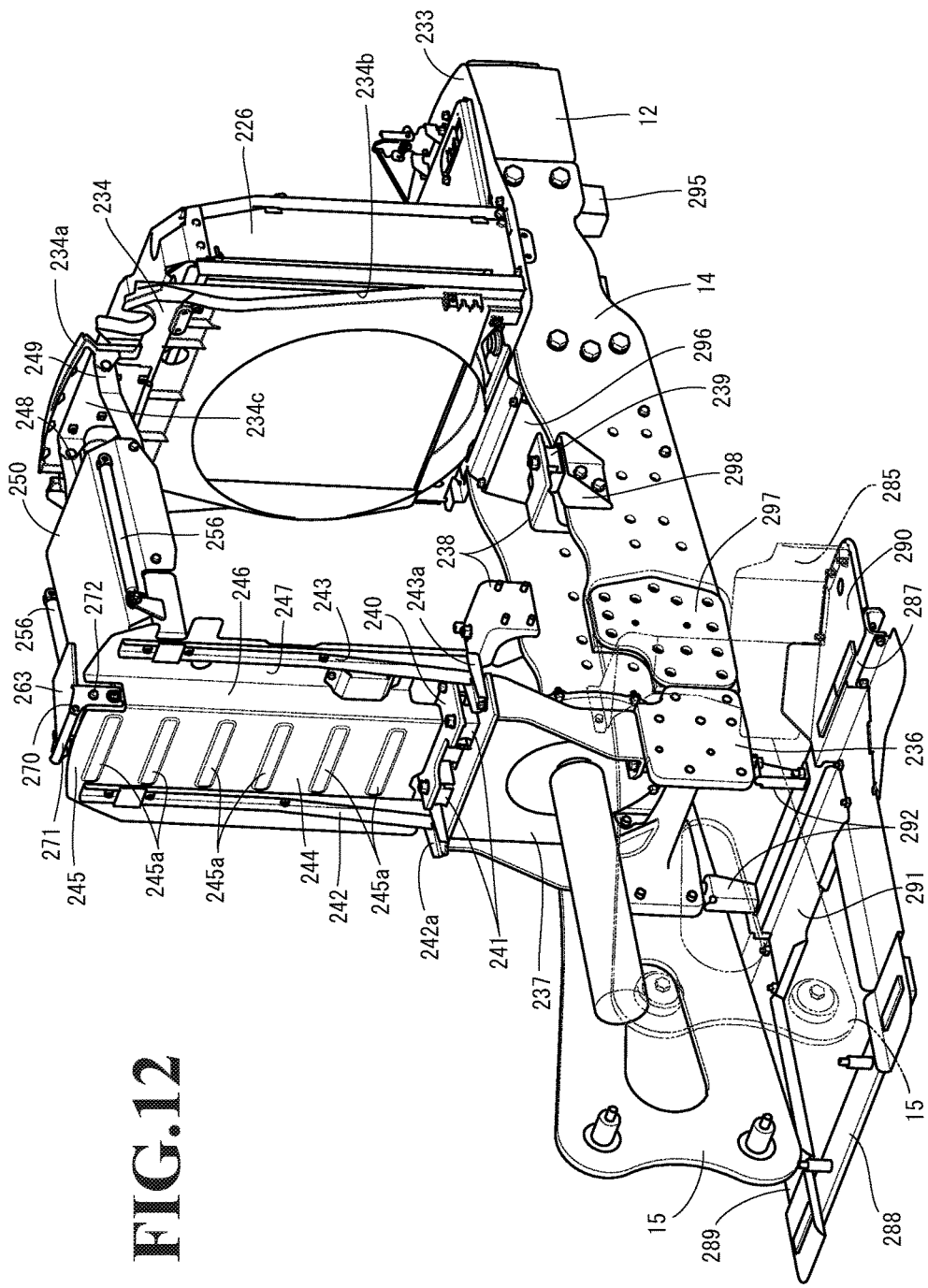
FIG. 12 is a perspective view illustrating a structure of an engine compartment frame as diagonally viewed from a right rear side.
Figure 13:
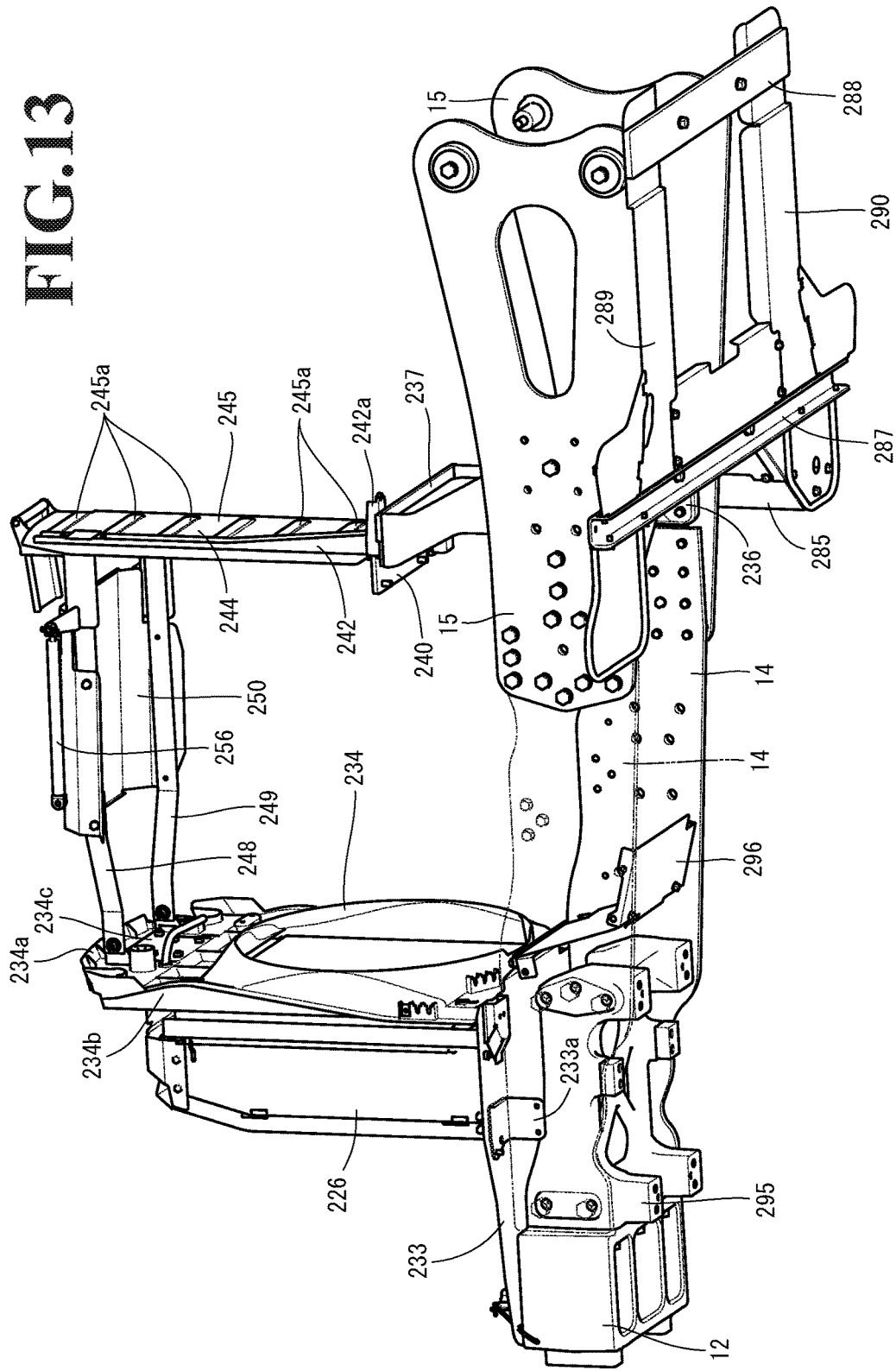
FIG. 13 is a perspective view illustrating a structure of the engine compartment frame as diagonally viewed from a left lower side.
Figure 14:
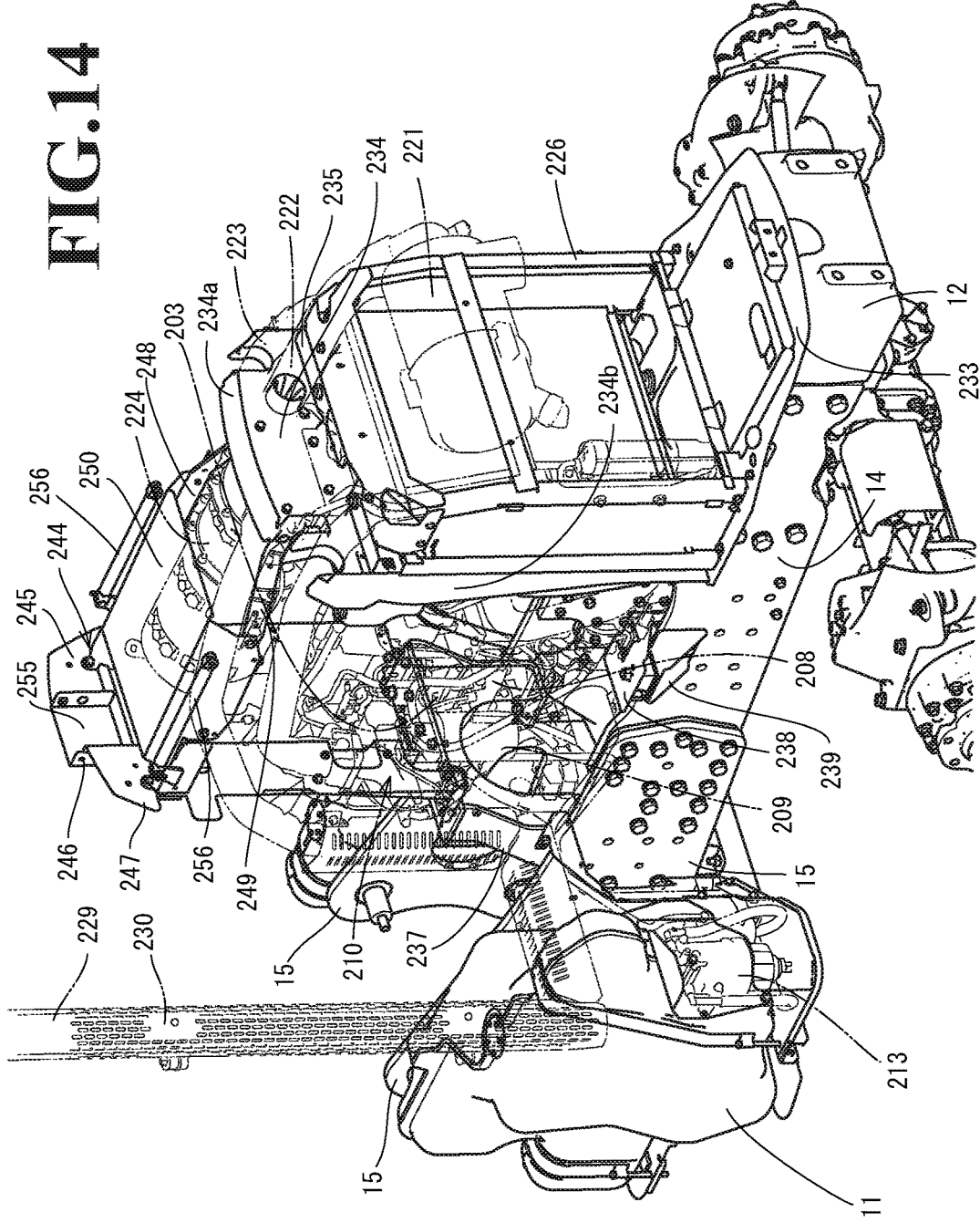
FIG. 14 is a perspective view illustrating the structure of the engine compartment as diagonally viewed from a right front side.
Figure 15:
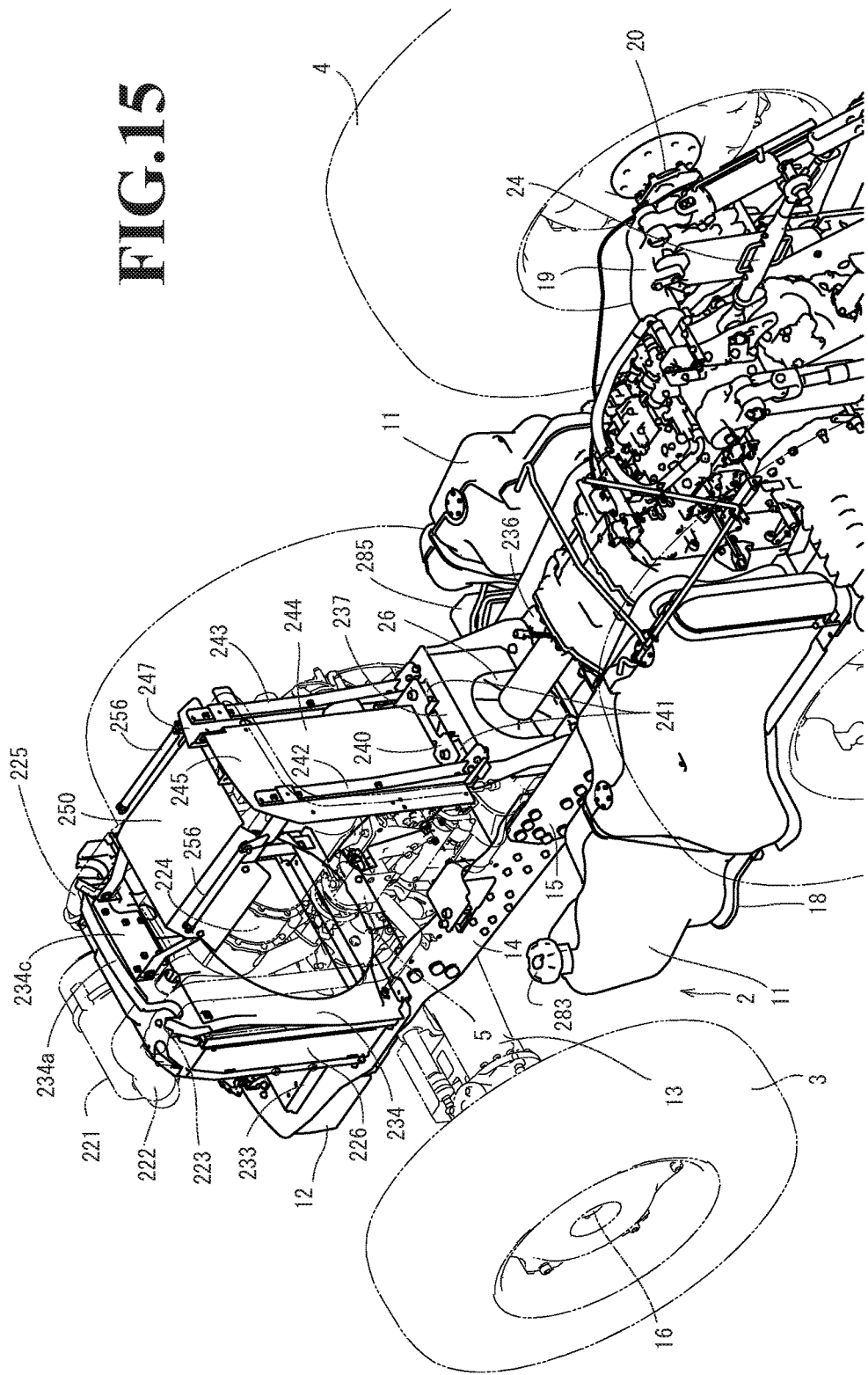
FIG. 15 is a perspective view illustrating the structure of the engine compartment as diagonally viewed from the left rear side.

An embodiment of the invention according to the present application is described below with reference to the drawings, with a tractor as an example of a working vehicle.

First of all, an overview of a tractor 1 is described with reference to FIG. 1 to FIG. 8. A traveling machine body 2 of the tractor 1 according to the embodiment is supported by a pair of left and right front wheels 3 and a pair of left and right rear wheels 4 as traveling units. A diesel engine 5 (hereinafter, simply referred to as an engine) of a common rail type, serving as a driving source, is installed in a front portion of the traveling machine body 2 and drives the rear wheels 4 and the front wheels 3 to make the tractor 1 travel forward and backward. The engine 5 is covered by a hood 6. A cabin 7 is disposed on an upper surface of the traveling machine body 2. The cabin 7 incorporates an operating seat 8 and a steering wheel (circular steering wheel) 9. A steering direction of the front wheels 3 moves left and right by steering the steering wheel 9. Steps 10 with which an operator gets on and off the vehicle are provided to an outer lower portion of the cabin 7. Fuel tanks 11 from which fuel is supplied to the engine 5 are provided below a bottom portion of the cabin 7.

The traveling machine body 2 includes: an engine frame 14 including a front bumper 12 and a front axle casing 13; and left and right vehicle body frames 15 detachably fixed to a rear portion of the engine frame 14. A front axle 16 rotatably protrudes outward from both left and right ends of the front axle casing 13. The front wheels 3 are attached to the both left and right ends of the front axle casing 13 via the front axle 16. A transmission case 17 is coupled to the rear portions of the vehicle body frames 15. The transmission case 17 shifts the rotary driving force from the engine 5 as appropriate, and transmits the force to the four front and rear wheels 3, 3, 4, and 4. A tank frame 18 having a rectangular plate shape in bottom view and protruding outward toward the left and the right is fastened to a lower surface side of the transmission case 17 and the left and the right vehicle body frames 15 with bolts. In this embodiment, the fuel tanks 11 include two left and right tanks. The left and the right fuel tanks 11 are respectively mounted on the upper surface sides of the left and the right protruding portions of the tank frame 18. Left and right rear axle cases 19 are mounted to left and right outer side surfaces of the transmission case 17 while protruding outward. Left and right rear axles 20 are rotatably inserted in the left and the right rear axle cases 19. The rear wheels 4 are attached to the transmission case 17 via the rear axles 20. The left and the right rear wheels 4 have upper sides covered with left and right rear fenders 21.

A hydraulic hoisting and lowering mechanism 22 that hoists and lowers a work machine such as a rotary tiller for example is detachably attached to an upper surface of a rear portion of the transmission case 17. The work machine such as a rotary tiller is coupled to the rear portion of the transmission case 17 via a three-point link mechanism including a pair of left and right lower links 23 and a top link 24. A power-take off (PTO) shaft 25 protrudes rearward from a rear side surface of the transmission case 17 and is used for transmitting a PTO driving force to the work machine such as a rotary tiller.

A flywheel 26 is attached to be directly coupled to an engine output shaft (not illustrated) that protrudes rearward from a rear side surface of the engine 5. A main driving shaft 27 protruding rearward from the flywheel 26 and a main transmission input shaft 28 protruding forward from a front surface side of the transmission case 17 are coupled to each other via a driving force transmission shaft 29 including universal joints on both ends. The transmission case 17 incorporates a hydraulic continuously variable transmission, a forward/backward traveling switching mechanism, a traveling sub-transmission gear mechanism, and a rear wheel differential gear mechanism. The rotary driving force from the engine 5 is transmitted to the main transmission input shaft 28 of the transmission case 17 via the main driving shaft 27 and the driving force transmission shaft 29, and appropriate shifting is achieved with the hydraulic continuously variable transmission and the traveling sub-transmission gear mechanism. The shifted driving force is transmitted to the left and the right rear wheels 4 via the rear wheel differential gear mechanism.

A front wheel output shaft 30 protruding forward from a lower portion of a front surface of the transmission case 17 is coupled to a front wheel transmission shaft (not illustrated) protruding rearward from the front axle casing 13 incorporating a front wheel differential gear mechanism (not illustrated), via a front wheel driving shaft 31. The shifted driving force, obtained by the hydraulic continuously variable transmission and the traveling sub-transmission gear mechanism in the transmission case 17, is transmitted to the left and the right front wheels 3 from the front wheel output shaft 30, the front wheel driving shaft 31 and the front wheel transmission shaft, via the front wheel differential gear mechanism in the front axle casing 13.

Next, an internal structure of the cabin 7 is described with reference to FIG. 5 to FIG. 10 and FIG. 17. A steering column 32 is disposed on a front side of the operating seat 8 in the cabin 7. The steering column 32 stands while being buried on a rear surface side of a dashboard 33 disposed on a front surface side in the cabin 7. The steering wheel 9 having a substantially circular shape in plan view is attached to an upper end side of a steering shaft protruding upward from an upper surface of the steering column 32.

The diesel engine 5 has a cylinder head mounted on a cylinder block incorporating the engine output shaft and pistons. An intake manifold 203 is disposed on a right side surface of the cylinder head and an exhaust manifold 204 is disposed on a left side surface of the cylinder head. Thus, in the engine 5, the intake manifold 203 and the exhaust manifold 204 are respectively disposed on both side surfaces along the engine output shaft. The cylinder block in the diesel engine 5 has a front surface provided with a cooling fan 206 and a rear surface provided with the flywheel 26. Thus, the flywheel 26 and the cooling fan 206 are respectively disposed on both side surfaces orthogonal to the engine output shaft in the engine 5.

The diesel engine 5 has a right side surface provided with: a fuel supply pump 207 for supplying fuel; a cylindrical common rail 208 through which the fuel is pumped to an injector; a fuel filter 209 that removes foreign objects from the fuel from the fuel tank 11; and an exhaust gas recirculation (EGR) device 210 coupled to the intake manifold 203. The fuel in the fuel tanks 11 is supplied by a fuel pump 213 to the fuel supply pump 207 via the fuel filter 209, and then is pumped to the common rail 208 from the fuel supply pump 207. Thus, the high pressure fuel is accumulated in the common rail 208, and injected from each injector to a corresponding cylinder of the engine 5, with fuel injection valves of the injectors each controlled to be opened and closed.

The diesel engine 5 has a left side surface provided with: a turbo supercharger 211 that compresses air with exhaust gas from the exhaust manifold 204; and an EGR cooler 212 with which the exhaust gas from the exhaust manifold 204 is partially cooled and recirculated to the EGR device 210. The turbo supercharger 211 includes a compressor case incorporating a blower wheel. The compressor case has an intake air intake side connected to an intake air exhaust side of an air cleaner 221 via an intake pipe 222, and has an intake air exhaust side connected to an intake air relaying pipe (on an intake air upstream side) 223. The turbo supercharger 211 includes a turbine case incorporating a turbine wheel. The turbine case has an exhaust air intake side coupled to an exhaust gas outlet of the exhaust manifold 204, and has an intake air exhaust side coupled to an exhaust gas inlet of an exhaust gas purifying device 224 as a post-processing device.

The EGR cooler 212 and the EGR device 210 respectively disposed on both side surfaces of the diesel engine 5 are connected to each other via a recirculation exhaust gas pipe 214 serving as a recirculation pipe path circumventing a rear surface (side of the flywheel 26) of the engine 5. The EGR device 210 is connected to an intake air relaying pipe (on an intake air downstream side) 225 extending forward (toward the cooling fan 206) on a right side of the engine 5. The intake air relaying pipes 223 and 225 are respectively disposed on the both side surfaces of the diesel engine 5, and extend forward and upward from the diesel engine 5 to be connected to an intercooler (not illustrated) disposed in a frame 226 on a front side of the diesel engine 5. The air cleaner 221 is disposed on an upper side of a front surface of the frame 226. The intake pipe 222 connected to the air cleaner 221 extends toward the rear side of the left side surface of the diesel engine 5 in such a manner as to be formed over the frame 226.

In the configuration described above, fresh air (outer air) taken into the air cleaner 221 is subjected to dust removal and purification in the air cleaner 221, and then is sucked into the compressor case of the turbo supercharger 211 via the intake pipe 222. The fresh air is compressed in the compressor case of the turbo supercharger 211 to be pressurized fresh air, and is supplied to an EGR main body case of the EGR device 210 via the intake air relaying pipes 223 and 225 and the intercooler. A part (EGR gas) of the exhaust gas from the exhaust manifold 204 is cooled by the EGR cooler 212 and then is supplied to the EGR main body case of the EGR device 210 via the recirculation exhaust gas pipe 214.

The EGR device 210 mixes the pressurized fresh air from the turbo supercharger 211 and the EGR gas from the exhaust manifold 204, and then supplies the resultant mixed gas to the intake manifold 203. In this manner, the part of the exhaust gas discharged from the diesel engine 5 to the exhaust manifold 204 is recirculated to the intake manifold 203. Thus, the maximum fuel temperature at the time of high load driving is reduced, and an amount of nitrogen oxide (NOx) discharged from the diesel engine 5 is reduced.

The diesel engine 5 includes the continuously regenerating exhaust gas purifying device 224 (diesel particulate filter (DPF)). The exhaust gas purifying device 224 removes particulate matters (PM) in exhaust gas discharged from the engine 5, and reduces carbon oxide (CO) and hydrocarbons (HC) in the exhaust gas. The exhaust gas purifying device 224 is disposed at a portion on an upper surface side of the diesel engine 5 above the exhaust manifold 204. The exhaust gas purifying device 224 has a substantially cylindrical shape extending in a front and rear direction in parallel with the output shaft (crank shaft) of the diesel engine 5. The exhaust gas purifying device 224 has the exhaust gas inlet and an exhaust gas outlet on both sides in the front and rear direction (upstream and downstream sides in the exhaust gas movement direction).

The exhaust gas purifying device 224 has a casing outer circumference surface on one end side (rear side) in a longitudinal direction provided with the exhaust gas inlet. The exhaust gas inlet is coupled to an exhaust gas exhaust side of the turbine case of the turbo supercharger 211. The exhaust gas purifying device 224 has a casing outer circumference surface on the other end side (front side) in the longitudinal direction provided with the exhaust gas outlet coupled to an exhaust pipe 227. The exhaust gas purifying device 224 has the exhaust gas inlet opened toward the lower side, and has the exhaust gas outlet opened toward right upper side. The exhaust pipe 227 is disposed to extend from the front left side to the rear right side of the diesel engine 5 while being disposed over the diesel engine 5.

An exhaust gas relaying bracket 215 forming a supporting member (DPF supporting member) of the exhaust gas purifying device 224 has a lower end side fastened to the exhaust manifold 204 with bolts. The exhaust gas relaying bracket 215 has an upper portion side in which an exhaust gas relaying pipe, serving as an exhaust gas relaying path, is formed. The exhaust gas relaying bracket 215 has an exhaust gas intake side of the exhaust gas relaying pipe fastened to the exhaust air discharge side of the turbine case in the turbo supercharger 211 with bolts, and has an exhaust air discharge side of the exhaust gas relaying pipe 85 fastened to an exhaust gas inlet of the exhaust gas purifying device 224. Thus, the exhaust manifold 204 and the exhaust gas purifying device 224 are communicated with each other via the turbine case of the turbo supercharger 211 and the exhaust gas relaying pipe of the exhaust gas relaying bracket 215.

The engine 5 includes an outlet side bracket member 216 and an inlet side bracket member 217 that serve as housing supporting members that support and fix the exhaust gas purifying device 224. The outlet side bracket member 216 and the inlet side bracket member 217 respectively stand from front and rear surface sides of the cylinder head of the engine 5 that are orthogonal to the engine output shaft. The inlet side bracket member 217 is positioned on the rear surface side of the engine 5, and supports the exhaust air intake side of the exhaust gas purifying device 224. The outlet side bracket member 216 is positioned on the front surface side of the engine 5, and supports an exhaust air discharge side of the exhaust gas purifying device 224.

The inlet side bracket member 217 has a lower end side fastened to the rear surface of the cylinder head of the engine 5 with bolts, and has an upper end side fastened to an inlet side lid member of the exhaust gas purifying device 224 via a relaying bracket 219. A part of a lower ends side rear surface of the inlet side bracket member 217 is protruded, and a supporting plate 218 is fastened to the protruding portion. The inlet side bracket member 217 and the supporting plate 218 are arranged in the front and rear direction and are coupled to each other. Thus, a space for installing the recirculation exhaust gas 214 coupling between the EGR device 210 and the EGR cooler 212 can be provided between the inlet side bracket member 217 and the supporting plate 218 without compromising the supporting strength of the exhaust gas purifying device 224.

The exhaust gas purifying device 224 and the exhaust pipe 227 are arranged above the diesel engine 5 side by side in a left and right direction while being in parallel with the output shaft of the diesel engine 5. More specifically, the exhaust gas purifying device 224 and the exhaust pipe 227 are arranged side by side in such a manner that the exhaust gas purifying device 224 covers the left side of the upper surface of the diesel engine 5 and the exhaust pipe 227 covers the right side of the upper surface of the diesel engine 5.

The exhaust pipe 227 connected to an exhaust side of the exhaust gas purifying device 224 is connected to a tail pipe 229 via a bellows pipe 228 standing on the rear and right side of the diesel engine 5. The tail pipe 229 has a shape of extending from the lower side to the upper side on the front and right side of the cabin 7, and being bent toward the diesel engine 5 on the lower side of the cabin 7. The tail pipe 229 has the lower bent portion formed to extend from the inner side to the outer side to be formed over the vehicle body frame 15. The tail pipe 229 is covered with a heat shield plate 230 except for an upper end portion.

Next, a configuration in an engine compartment frame below the hood 6 is described with reference to FIG. 5 to FIG. 18. A front grille 231 is formed on a lower side of a front portion of the hood 6, and covers a front side of the engine compartment. Engine covers 232 formed of porous plates are disposed on left and right lower sides of the hood 6 to cover left and right sides of the engine compartment. Thus, the hood 6 and the engine covers 232 cover the front, upper, left, and right sides of the diesel engine 5.

The pair of left and right engine frames 14 have front end side inner side surfaces coupled to left and right outer side surfaces of an axle case coupling member 295. The axle case coupling member 295 has a lower side provided with a coupling portion at four corners on front and rear-left and right sides protruding downward, and is coupled to the front axle casing 13, whereby the front axle casing 13 is supported while being suspended from the engine frame 14. The front bumper 12 is coupled to a front surface of the axle case coupling member 295 to be disposed at the position to be in contact with a front end surface of the engine frame 14.

A frame bottom plate 233 is bridged between the upper edges of the left and the right engine frames 14 and the upper surface of the front bumper 12 to cover the front end side upper side of the engine frame 14. The frame bottom plate 233 has a lower surface coupled to side surfaces of the left and the right engine frames 14 via coupling brackets 233a. The coupling brackets 233a disposed on the left and the right sides each have one end coupled to the side surface of the engine frame 14 and has the other end coupled to a side edge side of the lower surface of the frame bottom plate 233. An under cover 296 covering the lower front side of the engine 5 is disposed on the rear end of the frame bottom plate 233. The under cover 296 has a front end coupled to the frame bottom plate 233 and has rear left and right side edges respectively coupled to the left and the right engine frames 14. The under cover 296 includes: a front side portion extending from the rear end of the frame bottom plate 233 toward the lower end of the engine frame 14; and a rear side portion extending forward on the lower side of the engine 5.

A radiator 235 having a rear surface side on which a fan shroud 234 is attached stands on the frame bottom plate 233 to be positioned on the front surface side of the engine 5. The fan shroud 234 surrounds the outer circumference side of the cooling fan 206, and communicates between the radiator 235 and the cooling fan 206. The fan shroud 234 includes: an upper shielding portion 234a having an upper end with a T shaped cross-section; and side shielding portions 234b protruding from the left and the right side surfaces. The upper shielding portion 234a is disposed to extend in the left and right direction over the entire area of the upper surface of the fan shroud 234, and has an upper end disposed close to the lower surface of a ceiling portion 259 of the hood 6, when the hood 6 is closed. The pair of left and right side shielding portions 234b are disposed to extend in an upper and lower direction over the entire area of the left and the right side surfaces of the fan shroud 234, and have left and right ends disposed close to the inner side surfaces of side portions of the hood 6, when the hood 6 is closed.

The frame 226 having a rectangular frame shape stands on the frame bottom plate 233 on the front surface side of the radiator 235. The frame 226, the radiator 235, and the fan shroud 234 are arranged in this order from the front side at positions above the axle case coupling member 295 bridging between the left and the right engine frames 14. The frame 226 has a rear surface covered with the radiator 235, and has a front surface as well as left and right side surfaces covered with a mesh plate member. The intercooler described above, oil and fuel coolers, and the like are disposed in the frame 226. The air cleaner 221 is disposed at an upper position of the front surface of the frame 226. Thus, cooling air taken in through the front grille 231 flows toward the frame 226 behind the front grille 231. Thus, the air cleaner 221, the intercooler, and the oil and the fuel coolers in the frame 226 are cooled. The cooling air from the front side reaches the radiator 235 disposed on the rear surface of the frame 226, whereby a higher effect of cooling the cooling water supplied to the diesel engine 5 is achieved.

The left and the right vehicle body frames 15 have front end sides coupled to rear end sides of the left and the right engine frames 14 via a spacer 297, and are arranged to clamp the left and the right engine frames 14. The pair of left and right vehicle body frames 15 is coupled to each other via a supporting beam frame 236. Coupling surfaces (outer side surfaces) of the supporting beam frame 236 to be coupled with the vehicle body frame 15 are on the same plane as coupling surfaces (outer side surfaces) of the spacer 297 to be coupled with the vehicle body frames 15. The supporting beam frame 236 is fastened to each of the left and the right vehicle body frames 15 with bolts, and bridges between the left and the right vehicle body frames 15. An engine supporting frame 237 is mounted on the upper surface of the supporting beam frame 236. The engine supporting frame 237 has a lower end surface fastened to an upper surface of the supporting beam frame 236 with bolts, and thus has a shape surrounding the flywheel 26 of the diesel engine 5 together with the supporting beam frame 236.

The diesel engine 5 has engine leg attachment portions (not illustrated), provided to lower sides of left and right side surfaces, coupled to engine supporting brackets 298 disposed at intermediate portions of the pair of left and right engine frames 14, via engine leg members 238 each including an anti-vibration rubber piece 239. The diesel engine 5 has engine leg attachment portions (not illustrated), provided on the rear surface, coupled to the upper surface of the engine supporting frame 237 via engine leg members 240 each including an anti-vibration rubber piece 241.

The engine leg members 238 are fastened with bolts to the upper portions of the engine supporting brackets 298 coupled to outer sides of the intermediate portions of the pair of left and right engine frames 14 with the anti-vibration rubber piece 239 provided on the lower side. With the pair of left and right engine leg members 238, the engine frames 14 clamp the diesel engine 5, whereby the front side of the diesel engine 5 is supported. The diesel engine 5 has a rear surface coupled to front end sides of the pair of left and right vehicle body frame 15, via the supporting beam frame 236, the engine supporting frame 237, and the engine leg member 240, whereby the rear side of the diesel engine 5 is supported by the front ends of the vehicle body frames 15. The diesel engine 5 is supported to the traveling machine body 2 with the left and the right front anti-vibration rubber pieces 239 and the left and the right rear anti-vibration rubber pieces 241.

A pair of left and right column frames 242 and 243 stand on the upper surface of the engine supporting frame 237 in such a manner as to sandwich the engine leg members 240 from left and right. More specifically, the left side column frame 242 stands at a left rear side position of the engine leg member 240 via a supporting bracket 242a. The right side column frame 243 stands at a right front side position of the engine leg member 240 via a supporting bracket 243a. The supporting bracket 242a is disposed on the rear side of the left edge side of the engine supporting frame 237. The supporting bracket 243a is disposed on the front side of the right edge side of the engine supporting frame 237. A hood shield plate (shielding plate) 244 covering the rear side of the hood 6 has a lower edge coupled to the pair of left and right column frames 242 and 243 while being separated from the upper surfaces of the engine leg members 240.

The hood shield plate 244 has a bent shape in plan view. More specifically, the hood shield plate 244 includes: a rear shield surface (first shield surface) 245 that expands substantially in parallel with a front surface of a wind shield 321 from the outer side (left side) of the left side column frame 242 toward the right; a side shield surface (second shield surface) 246 extending forward from the right edge of the rear shield surface 245; and a connecting surface (third shield surface) 247 extending toward the right from the front edge of the side shield surface 245 to be connected to the right side column frame 243. The rear shield surface 245 is connected to the left side column frame 242, has a left edge protruding outward (toward the left) beyond the left side column frame 242, and is disposed while being separated from the front surface of the wind shield 321. The side shield surface 246 is disposed on the right side of the upper surface of the engine leg member 240. The connecting surface 247 is coupled to the right side column frame 243 to have the right edge matching the front surface of the right side column frame 243.

The hood shield plate 244 is disposed on the rear surface side of the hood 6 and at least covers the rear surfaces of the exhaust gas purifying device 224 and the exhaust pipe 227, on the inner side of the hood 6. The hood shield plate 244 protrudes toward the left beyond the left side column frame 242, and at least covers the rear surface of the left side (side of the exhaust manifold 204) of the diesel engine 5. The hood shield plate 244 has both edges connected to the pair of left and right column frames 242 and 243, and thus covers the entire rear surface of the diesel engine 5. An area on the right side of the hood shield plate 244 is open, and the bellows pipe 228 connected to the exhaust pipe 227 and a part of the tail pipe 229 are disposed in the area, on the rear surface side of the hood 6.

The hood shield plate 244 covers the rear surface of the hood 6, and thus shields the heat in the engine compartment below the hood 6, whereby the side of the cabin 7 is prevented from being heated by the exhaust heat from the engine compartment. Thus, an operator in the cabin 7 can comfortably operate the vehicle without being affected by the exhaust heat from the diesel engine 5 and the exhaust gas purifying device 224. The hood shield plate 244 is disposed while being separated from the front surface of the cabin 7, whereby a heat insulating layer is formed between the hood shield plate 244 and the cabin 7 disposed behind the hood 6.

The hood shield plate 244 has the rear shield surface 245 provided with recesses and protrusions at a predetermined interval, and thus shields noise generated from the engine compartment below the hood 6. More specifically, the hood shield plate 244 has a rear surface of the rear shield surface 245 provided with rectangular protrusions 245a protruding rearward at a predetermined interval in the upper and lower direction. With the recesses and the protrusions provided on the hood shield plate 244, noise generated from the diesel engine 5 in the engine compartment below the hood 6 is attenuated by the recesses and the protrusions of the hood shield plate 244 to be prevented from being transmitted into the cabin 7.

A pair of left and right beam frames 248 and 249 bridge between upper portions of the fan shroud 234 and the hood shield plate 244. The left side beam frame 248 has one end (rear end) coupled to the left side column frame 242 via the rear shield surface 245 of the hood shield plate 244. The right side beam frame 249, shorter than the left side beam frame 248, has one end (rear end) coupled to the right side column frame 243 via the connecting surface 247 of the hood shield plate 244. The pair of left and right beam frames 248 and 249 each have the other end (rear end) coupled to the upper rear surface of the fan shroud 234 via a coupling bracket 234c. The fan shroud 234 and the hood shield plate 244 stably supported by the traveling machine body 2 are bridged and coupled to each other by the pair of beam frames 248 and 249. Thus, the components are integrated to form a rigid engine compartment member as a whole.

A heat shield plate 250 has both left and right edges fixed to the pair of left and right beam frames 248 and 249. The heat shield plate 250 bridges between the beam frames 248 and 249 while covering an area from intermediate portions to rear sides of the beam frames 248 and 249 below the hood 6. The heat shield plate 250 is disposed to cover the upper portions of the exhaust gas purifying device 224 and the exhaust pipe 227 above the diesel engine 5. The heat shield plate 250 is fixed to bridge between the beam frames 248 and 249. Thus, the heat shield plate 250 reinforces the beam frames 248 and 249, whereby even more rigid structure can be achieved for the engine compartment frame. The heat shield plate 250 is disposed between the exhaust gas purifying device 224 and the exhaust pipe 227 and the hood 6, whereby the hood 6 can be prevented from being heated by the exhaust heat from the engine compartment.

The exhaust gas purifying device 224 is mounted to the upper portion of the diesel engine 5, and is positioned on the rear inner side of the hood 6, and the heat shield plate 250 is disposed between the hood 6 and the exhaust gas purifying device 224. The heat shield plate 250 disposed over the exhaust gas purifying device 224 can prevent the hood 6 from being heated by the exhaust gas from the exhaust gas purifying device 224 and the diesel engine 5. A space is formed between the hood 6 and the heat shield plate 250, whereby the exhaust gas purifying device 224 can be operated in a high temperature environment with the inside of the engine compartment below the heat shield plate 250 insulated from the outer air.

The hood shield plate 244 is provided in addition to the heat shield plate 250, and is disposed on the rear surface side of the hood 6 to cover at least the rear surface of the exhaust gas purifying device 224. Thus, heat in the engine compartment below the hood is shielded with the heat shield plate 250 and with the hood shield plate 244, whereby the heating in the cabin 7 by the exhaust heat from the engine compartment can be prevented. A gap is provided between the hood shield plate 244 and the heat shield plate 250, so that the heat is less likely to be accumulated in the engine compartment below the hood 6. Thus, heat damage on the exhaust gas purifying device 224 itself, the hood 6, and the like can be prevented.

The diesel engine 5 is installed in the front portion of the traveling machine body 2. The exhaust gas purifying device 224 is disposed on the upper portion of the diesel engine 5 and purifies the exhaust gas from the diesel engine 5. The cooling fan 206 cools the diesel engine 5 with air, and is disposed on the front surface side of the diesel engine 5. The fan shroud 234 covering the cooling fan 206 is fixed to the traveling machine body 2. The hood 6 covers the cooling fan 206, the diesel engine 5, and the exhaust gas purifying device 224. The hood shield plate 244 covers the rear side of the diesel engine 5 and is disposed on the rear surface of the hood 6. The hood shield plate 244 is fixed to the traveling machine body 2. The pair of left and right beam frames 248 and 249 bridge between the upper portions of the fan shroud 234 and the hood shield plate 244.

A wiper 251 that removes water drops on the wind shield 321 is pivotally supported by the wind shield 321. The wiper 251 has a driving shaft 252 inserted in the cabin 7 through the wind shield 321 and pivots about the driving shaft 252. The driving shaft 252 of the wiper 251 has a front side covered with the rear shield surface 245 of the hood shield plate 244. More specifically, the driving shaft 252 of the wiper 251 that performs a wiping operation on the wind shield 321 covering the front surface of the cabin 7 mounted to the traveling machine body 2 is covered with a rear portion of the upper surface of the hood 6 in front view. Thus, rain drops can be prevented from directly falling on the driving shaft 252 of the wiper 251 or a driving mechanism for the wiper 251, and a better appearance can be achieved.

A part of the wind shield 321 is provided with a through hole 253. A hydraulic pump 254 supported in the cabin 7 protrudes outward from the cabin 7 through the through hole 253. The through hole 253 is disposed at a position opposite to the connecting surface 247 of the hood shield plate 244. Thus, the hydraulic pump 254 disposed while protruding outward from the cabin 7 through the through hole 253 can be prevented from interfering with the hood shield plate 244. The hood shield plate 244 covers the front surface of the hydraulic pump 254, whereby the heating in the hood 6 due to heat emitted from the engine compartment can be prevented.

The rear shield surface 245 is disposed behind the hood shield plate 244, and covers the rear side of the exhaust gas purifying device 224 to be a high temperature heat source. Thus, a space for installing the exhaust gas purifying device 224 can be provided behind the connecting surface 244 covering the rear side of the exhaust pipe 227. Thus, a space for installing the hydraulic pump 254 can be provided behind the connecting surface 244. More specifically, the hood shield plate 244 is bent to be in a crank form in plan view, whereby a wide space that is less affected by the exhaust heat from a side of the engine compartment can be provided on the front side of the cabin 7 (operating seat 8), whereby the hydraulic pump 254 and the like can be appropriately disposed.

A hood supporting bracket 255 is provided at an upper edge of the front surface of the hood shield plate 244 to pivotally support the rear side of the hood 6. The hood supporting bracket 255 has both left and right edges bent to be fixed to the rear shield surface 245 and the side shield surface 246 of the hood shield plate 244. Thus, the hood supporting bracket 255 has the rear surface connected to the rear shield surface 245 and has the side surface extending from the right edge side connected to the side shield surface 246.

Figure 16:
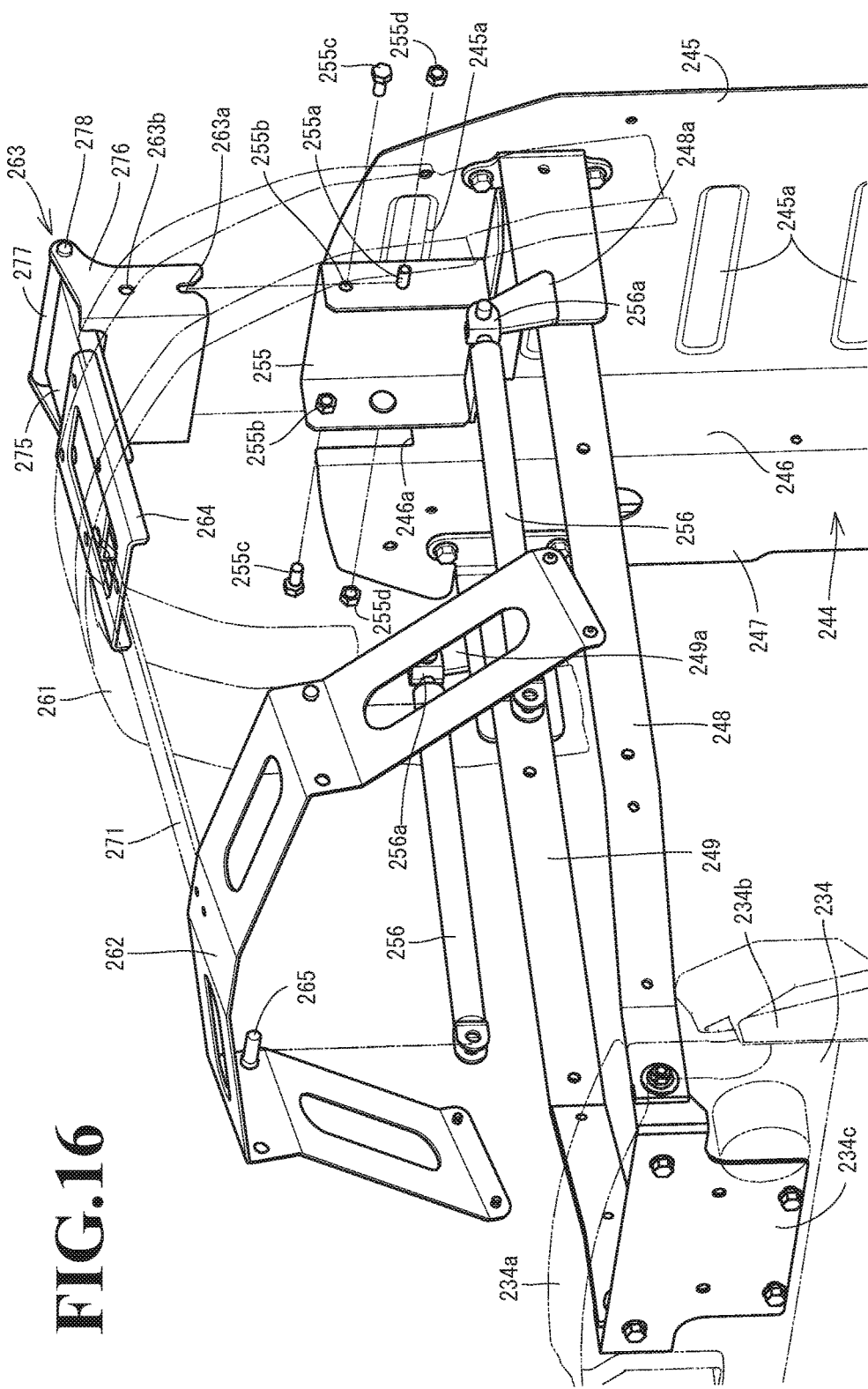
FIG. 16 is an exploded perspective view illustrating a structure of an opening and closing supporting mechanism of a hood.

As illustrated in FIG. 16, the hood supporting bracket 255 has an upper end side coupled to a hinge member 263 that pivots while being coupled to and supporting the rear portion of the hood 6. The side shield surface 246 of the hood shield plate 244 has an upper edge side provided with a notch portion 246a. Thus, a part of the right side surface of the hood supporting bracket 255 can be accessed from the outside of the hood shield plate 244. The hood supporting bracket 255 has tacking pins 255a for tacking the hinge member 263 coupled to the hood 6 protruding from the left and the right outer side surfaces. The hood supporting bracket 255 is provided with nuts 255b to which the hinge member 263 is coupled at positions above the tacking pins 255a, on both left and right side surfaces.

Gas springs (hood dampers) 256 and 256 that can make a telescopic movement are disposed on both left and right sides of the heat shield plate 250 below the hood 6. The pair of left and right gas springs 256 and 256 each have one end (rear end) pivotally supported on the rear end side of the corresponding one of the pair of left and right beam frames 248 and 249, and have the other end (front end) pivotally supported to the upper inner side surface of the hood 6. Thus, when the front portion of the hood 6 is lifted, the hood 6 is opened about the upper end position of the hood shield plate 244, so that a maintenance work and the like can be performed for the diesel engine 5.

The hood 6 has a front surface center position provided with the front grille 231 as illustrated in FIG. 1 to FIG. 4 and FIG. 17 to FIG. 23. Head lights 257 and 258 are arranged in the upper and lower direction on each of both left and right sides of the front grille 231. The ceiling portion 259 on the upper side of the hood 6 inclines diagonally upward from the front side toward the rear side. A space below the rear portion side of the ceiling portion 259 is large. Thus, a large space can be provided for accommodating the exhaust gas purifying device 224 in the engine compartment in the hood 6. The hood 6 has an opening 268 formed on the front side of each of left and right side surface portions 269. The cooling air is taken in from both left and right sides of the hood 6 through the openings 268. Furthermore, an opening 270 is formed on the front side of the ceiling portion 259 of the hood 6, and thus the cooling air is further taken in from the front upper side of the hood 6 through the opening 270.

With a space formed by arranging the heat shield plate 250 covering the upper side of the exhaust gas purifying device 224 and the ceiling portion 259 of the hood 6 sufficiently separated from each other, an excellent heat balance can be maintained in the engine compartment. Furthermore, the front grille 231 for taking in the cooling air is disposed in a wide area at the center of the front surface of the hood 6. Thus, the cooling air can be sufficiently supplied into the engine compartment, whereby the heat can be prevented from accumulating in the hood 6. The openings 268 and 270 are formed on the both side surface portions 269 of the hood 6 and on the front side of the ceiling portion 259, whereby an optimum cooling structure can be achieved in the engine compartment below the hood 6.

The engine covers 232 that are punched over the entire surfaces are disposed in wide areas on the left and right rear lower sides of the hood 6. Thus, air heated by the diesel engine 5 and the exhaust gas purifying device 224 can be discharged outside. An upper end position of the engine cover 232 is positioned below exhaust gas purifying device 224, whereby a high temperature maintaining effect can be achieved by the hood 6 for the exhaust gas purifying device 224. Thus, a high temperature regeneration operation can be achieved.

As illustrated in FIG. 16 to FIG. 23, the ceiling portion 259 of the hood 6 has a rear edge provided with a notch portion 260. The driving shaft 252 of the wiper 251 is disposed on the rear side of the notch portion 260. Thus, the driving shaft 252 is covered with the rear portion of the ceiling portion 259 of the hood 6 in front view of the hood 6. The hood 6 has a rear frame 261 and an intermediate frame 262 fixed to a back surface of the ceiling portion 259. The rear frame 261 extends in the left and right direction to bridge between rear sides of the ceiling portion 259. The intermediate frame 262 extends in the left and right direction to bridge between intermediate portions of the ceiling portion 259. The rear frame 261 and the intermediate frame 262 each have a shape curved along an inner circumference surface of the hood 6. The rear frame 261 and the intermediate frame 262 each have both end portions fixed to inner side surfaces of the left and the right side surface portions 269 of the hood 6.

On the back surface side of the ceiling portion 259, the rear frame 261 has a center position provided with a hood side coupling member (supporting member) 264 fixed by being fit on the hinge member 263 of the hood supporting bracket 255. A longitudinal frame 271 extends in the front and rear direction on the ceiling portion 259 of the hood 6 to couple between the center position of the rear frame 261 in the left and right direction and the center position of the intermediate frame 262 in the left and right direction. The hood side coupling member 264 is also coupled to the longitudinal frame 271 having a rear end fixed to the rear frame 261.

The ceiling portion 259 has the back surface side provided with a rear left shielding member (shielding plate) 266 and a rear right shielding member (shielding plate) 267. The rear left shielding member 266 is at a left side position on a rear end of the hinge member 263 and is an extension of the upper side of the rear shield surface 245 of the hood shield plate 244. The rear right shielding member 267 is at a right side position on the rear end of the hood side coupling member (supporting member) 264, and is an extension of the connecting surface 247 of the hood shield plate 244. A coupling plate member 272 is coupled to the back surface of the ceiling portion 259 at a position more on the rear side than the rear frame 261, and is disposed at a left side position of the hood side coupling member 264. The rear left shielding member 266 is connected to a rear edge of the coupling plate member 272. The rear right shielding member 267 is connected to a rear edge of the rear frame 21.

In the hood 6, shielding protrusions (shielding plates) 273 protrude from the inner side surfaces of the left and the right side surface portions 269 and extend in the upper and lower direction. The shielding protrusion 273 has a distal end covered with a seal member 274. The shielding protrusions 273 are disposed at positions close to left and right portions of the radiator 235. More specifically, the shielding plate 273 protrudes at a position more on the rear side than the opening 268 of the hood 6 and extends in the upper and lower direction along the rear edge of the opening 268. Thus, when the hood 6 is closed, the shielding protrusion 273 comes into contact with the side shielding portion 234b of the fan shroud 234 positioned on the rear surface of the radiator 235.

Figure 22:
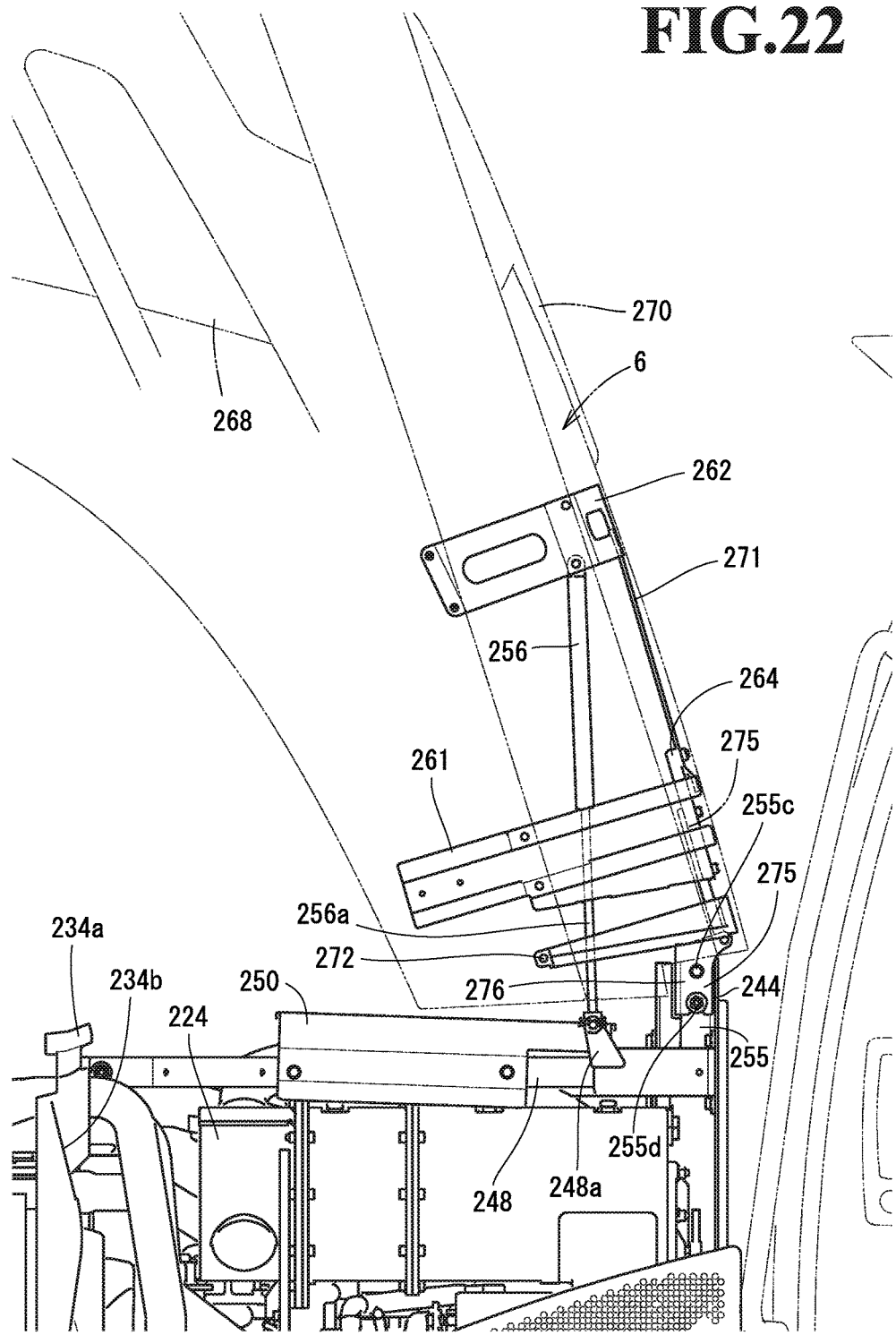
FIG. 22 is a diagram illustrating a supporting structure for the hood.
Figure 23:
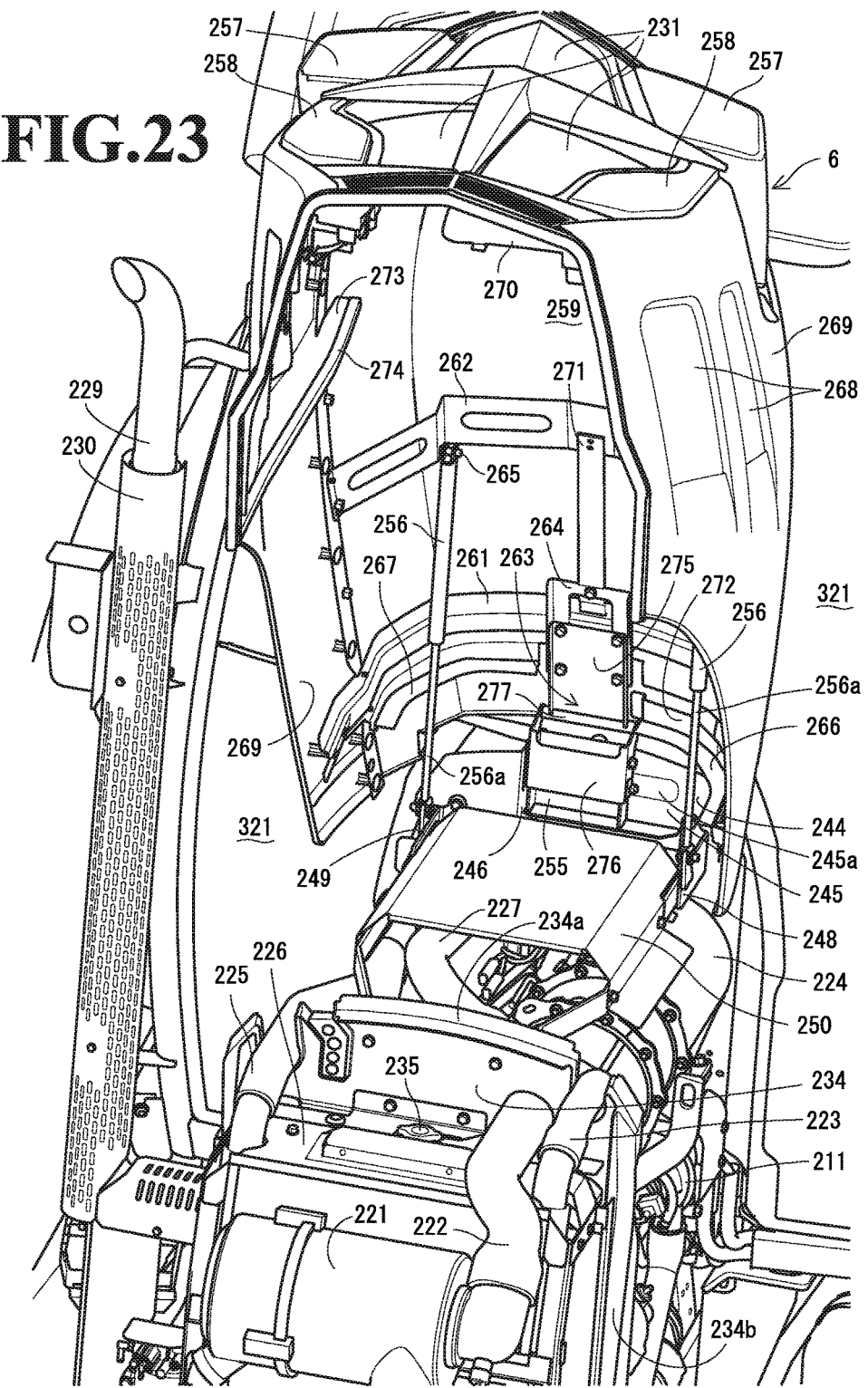
FIG. 23 is a perspective view illustrating the structure in the engine compartment in the state where the hood is open.

The intermediate frame 262 is provided with shafts 265 that are at upper positions of left and right surfaces bent downward at both left and right sides of the ceiling portion 259, and protrude inward. The pair of left and right gas springs 256 each have a front end pivotally supported by the left and the right shafts 265. Rods 256a are inserted in rear ends of the left and the right gas springs 256. Supporting portions 248a and 249a are provided on rear end sides of the beam frames 248 and 249 and axially support the rear ends of the rods 256a of the gas springs 256. As illustrated in FIG. 22, the gas spring 256 has the rod 256a extended when the hood 6 is opened, and pivots about the supporting portions 248a and 249a to support the front side of the hood 6 at the intermediate frame 262.

The hinge member 263 includes: a pivoting portion 275 fixed to the hood 6; and a fixed portion 276 fixed to the hood shield plate 244. The pivoting portion 275 is pivotally supported to be able to pivot about the fixed portion 276. The pivoting portion 275 is fastened to the hood side coupling member 264 fixed to the ceiling portion 259, and is fixed to the back surface of the ceiling portion 259. The fixed portion 276 is bent at both left and right edges, to have a substantially U shape (rectangular U shape) in plan view. The fixed portion 276 has left and right side surfaces each include: a notched groove 263a formed by partially notching the lower edge toward the upper side; and a bolt inserted hole 263b in which a bolt 255c is inserted. The pivoting portion 275 has a rear end provided with a shaft tube 277 extending in the left and right direction. A core rod (rotational shaft) 278 inserted in the shaft tube 277 has both left and right ends rotatably supported by upper ends of the left and the right side surfaces of the fixed portion 276.

As illustrated in FIG. 16, the fixed portion 276 of the hinge member 263 is fit to the hood supporting bracket 255 from the upper side, and is disposed to cover the front side of the hood supporting bracket 255. Here, the tacking pins 255a of the hood supporting bracket 255 are fit to the notched grooves 263a of the fixed portion 276, whereby the hinge member 263 can be guided to the fixed position with respect to the hood supporting bracket 255. More specifically, the fixed portion 276 is fixed to the hood supporting bracket 255 with the tacking pins 255a inserted in the notched grooves 263a, and with inner sides of the left and the right side surfaces of the fixed portion 276 in contact with outer sides of the left and the right side surfaces of the hood supporting bracket 255.

Then, nuts 255d are screwed to the tacking pins 255a of the hood supporting bracket 255, and the bolts 255c are screwed to the nuts 255b of the hood supporting bracket 255. Thus, the hinge member 263 is fastened to the hood supporting bracket 255. More specifically, the nuts 255d are fastened to the tacking pins 255a inserted in the notched grooves 263a of the fixed portion 276, and the bolts 255c inserted in the bolt inserted holes 263b of the fixed portion 276 are fastened to the nuts 255b. Thus, the fixed portion 276 is fixed to the hood supporting bracket 255. As a result, the fixed portion 276 and the hood supporting bracket 255 form a frame having a rectangular cross-section, whereby the hinge member 263 can be highly rigidly supported to the hood supporting bracket 255 so that sufficient supporting strength can be achieved when the hood 6 is opened.

The hood shield plate 244 covering the rear side of the diesel engine 5 is disposed on the rear surface of the hood 6 while being fixed to the traveling machine body 2. The heat shield plate 230 is disposed between the hood 6 and the exhaust gas purifying device (post-processing device) 224. The hood 6 is opened/closed by being pivoted about the upper end position of the hood shield plate 244.

The hood shield plate 244 is disposed while being separated from the front side of the cabin 7 disposed on the rear side of the hood 6. The beam frames 248 and 249 in parallel with the traveling machine body 2 are disposed on both sides of the front surface of the hood shield plate 244. The hood 6 includes: the hinge member 263 to which the pivoting portion 275 is connected, disposed at the rear end position of the hood 6; and the damper (gas spring) 256 that has one end connected to the front side of the hood 6 and makes telescopic movement. The fixed portion 276 of the hinge member 263 is connected to the hood supporting portion (hood supporting bracket) 255 disposed on the upper edge side of the hood shield plate 244. The other end of the damper 256 is rotatably supported by the beam frames 248 and 249.

Figure 17:
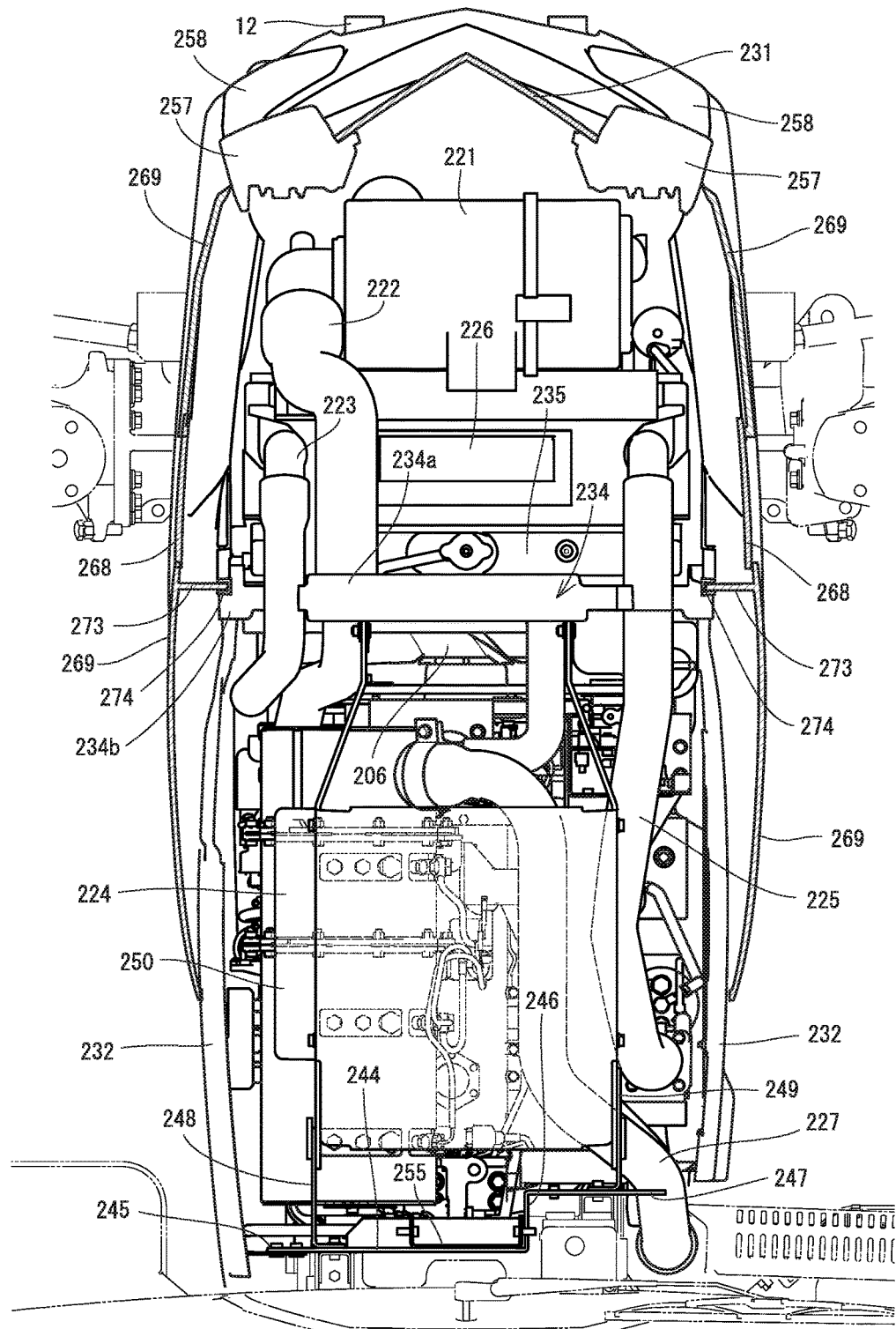
FIG. 17 is a cross-sectional plan view illustrating a structure in the hood.

As illustrated in FIG. 17, the shielding protrusions 273 protruding toward the inner sides of the both side surface portions 269 of the hood 6 are in contact with the side shielding portions 234b disposed on the side surfaces of the fan shroud 234 in a state where the hood 6 is closed. A flow of cooling air, taken in though the opening 268 formed on the front side of the shielding protrusion 273, toward the rear side is blocked in the space on the outer side of the frame 226 and the radiator 235 in the hood 6 by the shielding protrusion 273 and the side shielding portion 234b. Thus, the cooling air taken in through the opening 268 is forcibly sent through meshes of the mesh plate members on the front surface and the left and the right side surfaces of the frame 226.

Figure 18:
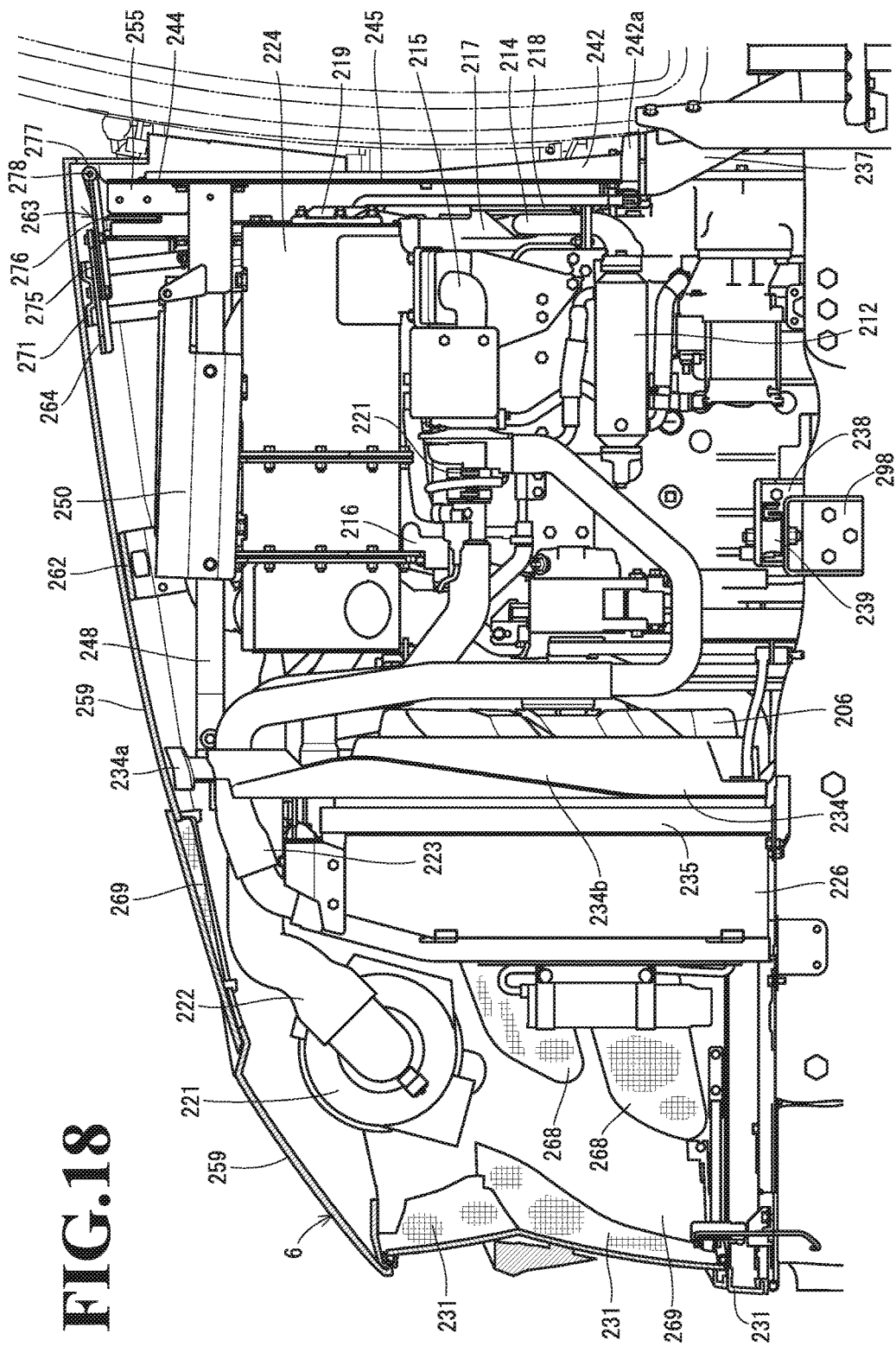
FIG. 18 is a cross-sectional side view illustrating the structure in the hood.
Figure 19:
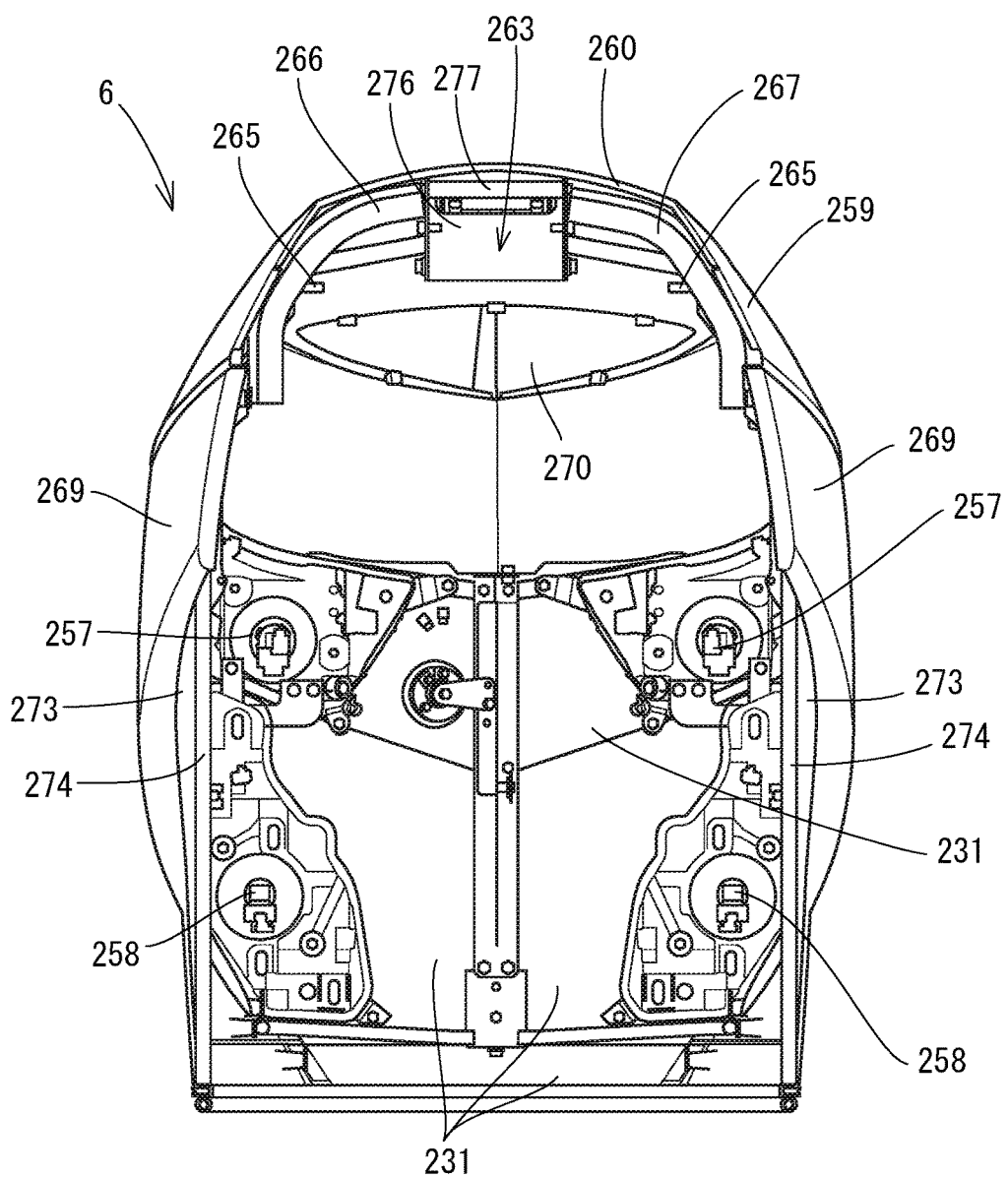
FIG. 19 is a diagram illustrating the hood as viewed from a rear surface.
Figure 20:
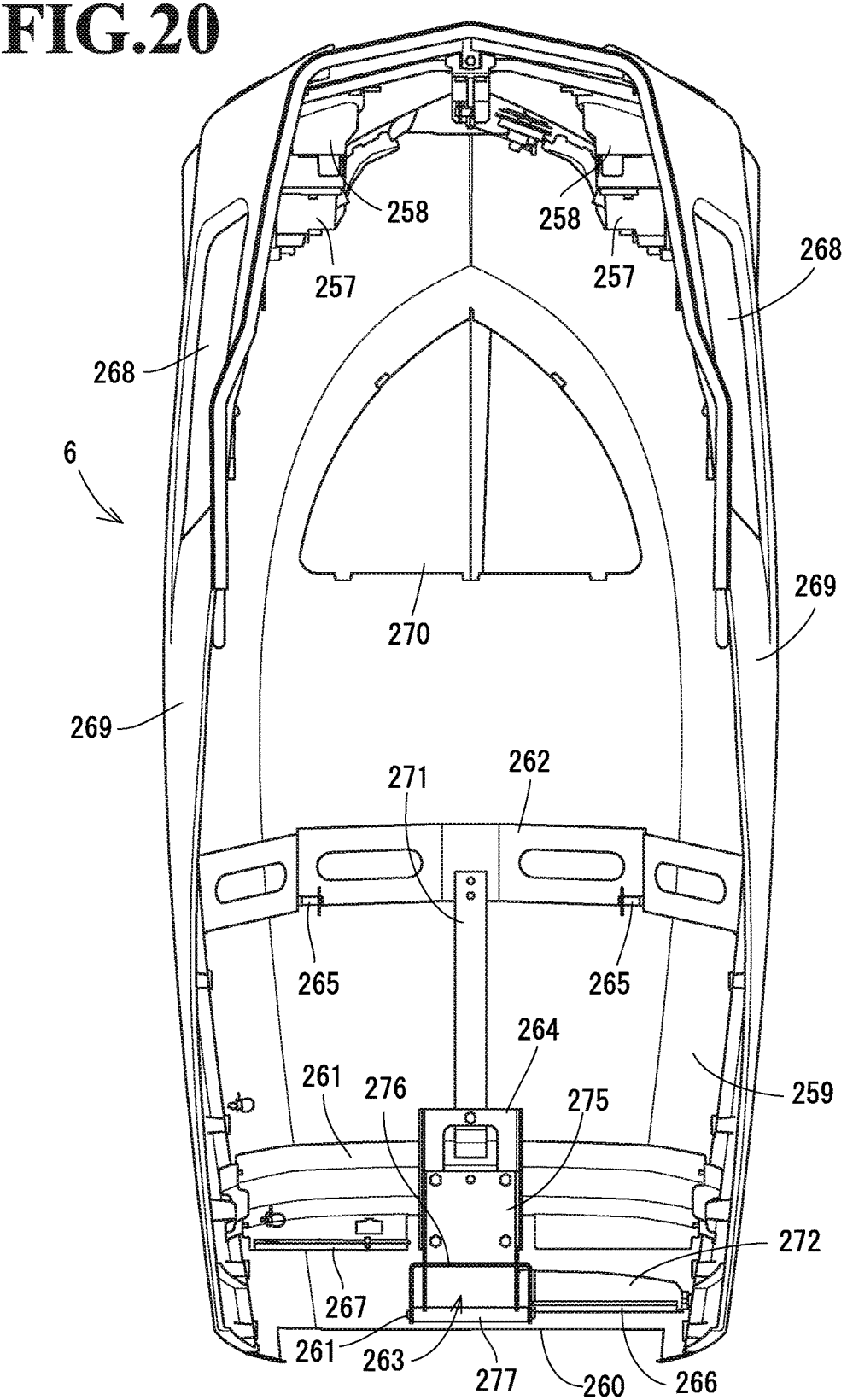
FIG. 20 is a diagram illustrating the hood as viewed from a bottom surface.
Figure 21:
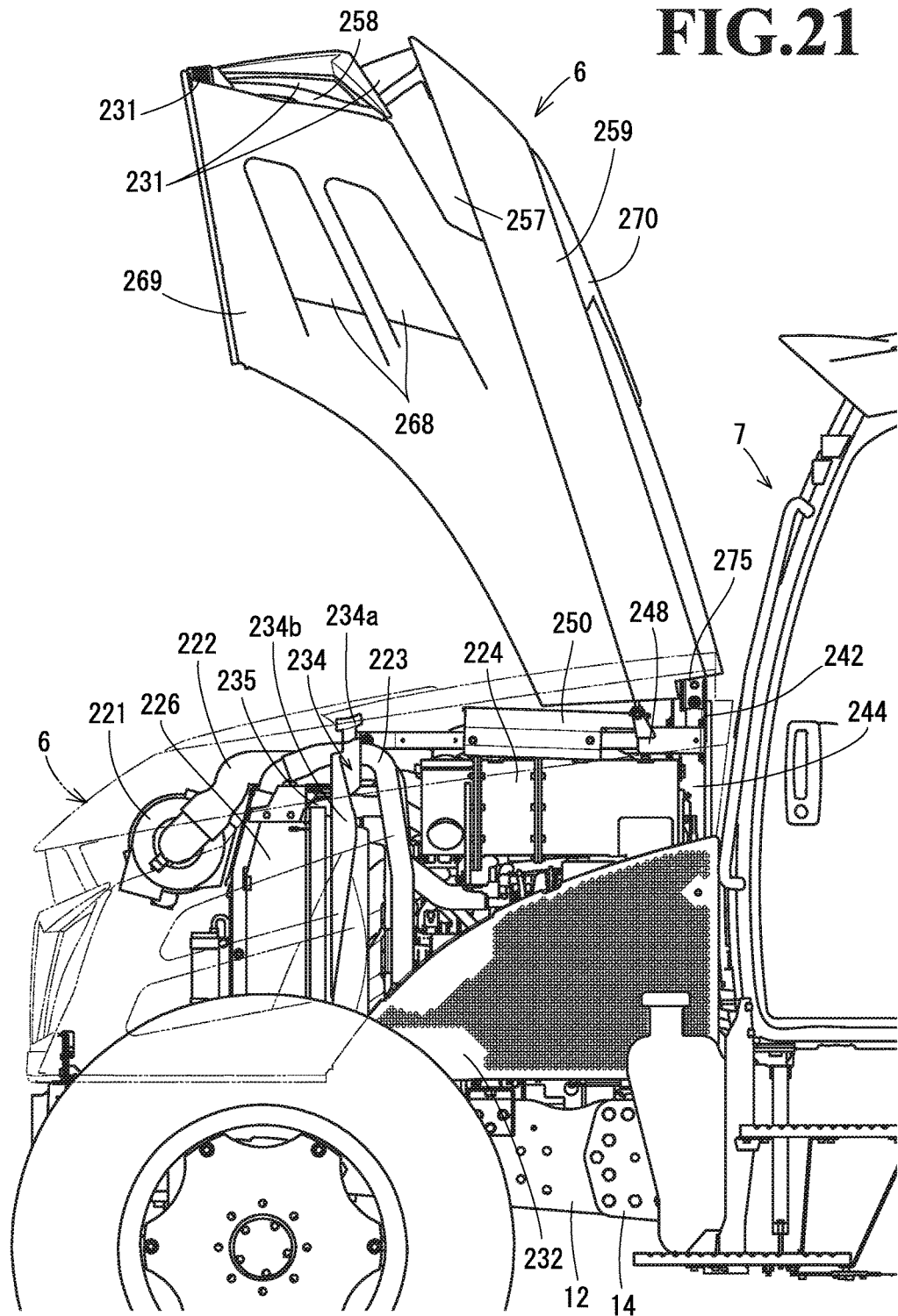
FIG. 21 is a diagram illustrating the tractor as viewed from the left side surface in a state where the hood is open.

As illustrated in FIG. 18, the back surface of the ceiling portion 259 of the hood 6 is disposed close to the upper shielding portion 234a provided on the upper surface of the fan shroud 234, in the state where the hood 6 is closed. The flow of the cooling air taken in through the opening 270 positioned on the front side of the upper shielding portion 234a toward the rear side is partially blocked in the space on the outer side of the frame 226 and the radiator 235 in the hood 6 by the upper shielding portion 234a. Thus, a large portion of the cooling air taken in through the opening 268 is forcibly sent through meshes of the mesh plate members on the front surface and the left and the right side surfaces of the frame 226.

As described above, the shielding protrusion 273 and the side shielding portion 234b are positioned on the rear side of the opening 268 and the upper shielding portion 234a is disposed on the rear side of the opening 270 in the state where the hood 6 is closed. Thus, a large amount of cooling air can be taken into the frame 226. Thus, a higher effect of cooling various cooling members such as the radiator 235 and the intercooler disposed on the front side of the engine compartment is achieved. A large amount of cooling air can be taken in by the cooling fan 206 surrounded by the fan shroud 234. Thus, the cooling air can be supplied to the engine 5 as the heat emitting member. Thus, an excellent heat balance can be achieved in the engine compartment.

The hood 6 has the openings 268 formed on the both left and right side portions (side surface portions) 269. The shielding plate (shielding protrusion) 273 is disposed at a position close to the left and the right side portions of the radiator 235. Thus, the cooling air taken in through the openings 268 can be sent toward the front surface side of the radiator 235. Thus, the radiator 235 can be efficiently cooled with the amount of cooling air passing through the radiator 235 increased. The radiator 235 stands in a front portion of the traveling machine body 2 and the fan shroud 234 surrounding the cooling fan 206 is attached on the rear surface side of the radiator 235. Thus, the shielding plates 273 provided to the hood 6 are in contact with the both left and right side portions of the fan shroud 234 when the hood 6 is closed.

The hood 6 further has the opening 270 formed on the ceiling portion 259. The fan shroud 234 includes: the upper shielding portion 234a extending in the left and right direction on the upper surface; and the pair of left and right side shielding portions 234b extending in the upper and lower direction on the left and the right side surfaces. When the hood 6 is closed, the upper shielding portion 234a is disposed close to the back surface of the ceiling portion 259 of the hood 6, and the side shielding portion 234b is in contact with the shielding plate of the hood 6. The openings 270 and 268 formed on the ceiling portion 259 and the both left and right side portions 269 of the hood 6 are positioned more on the front side than the fan shroud 234.

The configuration of portions in the invention according to the present application is not limited to that in the illustrated embodiment, and can be modified in various ways without departing from the gist of the invention according to the present application.

The embodiments of the invention according to the present application relates to a working vehicle such as a tractor for a farming work or a wheel loader for a construction work.

What is claimed is:

1. A working vehicle comprising:
an engine installed in a front portion of a traveling machine body; and
a post-processing device configured to purify exhaust gas from the engine,
wherein the post-processing device is mounted on an upper side of the engine,
wherein the engine and the post-processing device are covered with a hood,
wherein a hood shield plate is disposed on a rear-surface side of the hood and covers at least the post-processing device from a rear surface, wherein the hood shield plate comprises:
a first shield surface that is disposed on a first side of the hood and covers a rear side of the post-processing device;
a second shield surface that extends forward from a side edge of the first shield surface; and
a third shield surface that extends toward a second side of the hood from a front edge of the second shield surface; and
a heat insulating layer formed between an operating seat disposed on a rear side of the hood and the hood shield plate, wherein:
the post-processing device is disposed in parallel with an output shaft of the engine, and
on the rear side of the hood, an open space is provided between the third shield surface of the hood shield plate and the second side of the hood, and an exhaust pipe connected to an exhaust side of the post-processing device extends from the post-processing device toward the rear side of the hood.

2. The working vehicle according to claim 1, wherein:
a cooling fan configured to cool the engine is disposed on a front surface side of the engine,
the cooling fan, the engine, and the post-processing device are covered with the hood,
cooling air is taken into the hood from a front surface of the hood by actuating the cooling fan,
an engine cover formed of porous plates is disposed on a left rear lower side of the hood and a right rear lower side of the hood, and
an upper end position of at least one engine cover is disposed below the post-processing device.

3. The working vehicle according to claim 2, wherein:
openings are formed on both left and right side portions of the hood, and shielding plates are disposed at positions close to left and right side portions of a radiator.

4. The working vehicle according to claim 3, wherein:
the radiator stands on a front portion of the traveling machine body,
a fan shroud surrounding the cooling fan is attached to a rear surface side of the radiator,
when the hood is closed, the shielding plates provided to the hood are in contact with both left and right side portions of the fan shroud.

5. The working vehicle according to claim 4, wherein:
an opening is further formed on a ceiling portion of the hood,
the fan shroud has an upper surface provided with an upper shielding portion that extends in a left and right direction and left and right surfaces provided with a pair of left and right side shielding portions extending in an upper and lower direction,
when the hood is closed, the upper shielding portion is disposed close to a back surface of the ceiling portion, and the side shielding portions are in contact with the shielding plates of the hood, and
the openings on the ceiling portion and the both left and right side portions of the hood are disposed more on a front side than the fan shroud.

6. The working vehicle according to claim 2, wherein:
the hood shield plate that covers the rear side of the engine is disposed on the rear surface of the hood,
a fan shroud surrounding the cooling fan is fixed to the traveling machine body,
a pair of left and right beam frames bridge between upper portions of the fan shroud and the hood shield plate,
a heat shield plate having both left and right edges fixed to the pair of left and right beam frames is provided, and
the heat shield plate is disposed to cover an upper portion of the post-processing device below the hood.

7. The working vehicle according to claim 1, wherein:
the hood shield plate covering a rear side of the engine is fixed to the traveling machine body to be disposed on the rear surface of the hood,
a heat shield plate is disposed between the hood and the post-processing device, and
the hood is configured to pivot about an upper end position of the hood shield plate to be opened and closed.

8. The working vehicle according to claim 7, wherein:
the hood shield plate is disposed while being separated from a front side of the operating seat disposed on the rear side of the hood,
beam frames in parallel with the traveling machine body are disposed on both sides on a front surface of the hood shield plate,
the hood includes:
a hinge having a pivoting portion connected to a rear end position of the hood; and
a damper that has a first end connected to a front side of the hood and makes a telescopic movement,
a fixed portion of the hinge is connected to a hood supporting portion provided on an upper edge side of the hood shield plate, and
a second end of the damper is rotatably supported by the beam frame.

9. The working vehicle according to claim 1, wherein the hood shield plate has recesses and protrusions formed at a predetermined interval to block sound generated from an engine compartment below the hood.

10. The working vehicle according to claim 1, wherein the exhaust pipe connected to the exhaust side of the post-processing device further extends toward the rear side of the hood past an edge of the hood shield plate.

11. The working vehicle according to claim 1, wherein the post-processing device is disposed in parallel with the output shaft of the engine such that a longitudinal axis of the post-processing device is parallel with a longitudinal axis of the output shaft, and wherein the post-processing device comprises a first planar surface facing a front of the traveling machine body and a second planar surface facing a rear of the traveling machine body.

12. A working vehicle comprising:
   an operating seat;
   an engine;
   a post-processing device coupled to an upper side of the engine, the post-processing device configured to purify exhaust gas from the engine;
   a hood configured to cover the engine and the post-processing device;
   an exhaust pipe connected to an exhaust side of the post-processing device; and
   a hood shield plate positioned between the operating seat and the post-processing device, the hood shield plate comprising:
      a first shield portion that extends from a side edge toward a second side of the hood and covers a rear side of the post-processing device;
      a second shield portion extending forward from the side edge of the first shield portion; and
      a third shield portion that extends toward a first side of a hood from a front edge of the second shield portion; and
   wherein the exhaust pipe extends from the post-processing device toward the operating seat and past an edge of the hood shield plate.

13. A system comprising:
   an engine;
   a post-processing device coupled to an upper side of the engine, the post-processing device configured to purify exhaust gas from the engine;
   a hood configured to cover the engine and the post-processing device;
   an exhaust pipe connected to an exhaust side of the post-processing device; and
   a hood shield plate positioned between an operating seat and the post-processing device, the hood shield plate comprising:
      a first shield portion that extends from a side edge toward a second side of the hood and covers a rear side of the post-processing device, the first shield portion comprises a first surface that faces the post-processing device and a second surface that opposes the first surface;
      a second shield portion extending forward from the side edge of the first shield portion; and
      a third shield portion that extends toward a first side of a hood from a front edge of the second shield portion; and
   wherein the third shield portion and the first side of the hood define an open space, and the exhaust pipe extends through the open space.

14. The system of claim 13, wherein the hood shield plate is interposed between the first side of the hood and the second side of the hood.

15. The system of claim 14, wherein the side edge of the first shield portion extends from the first surface to the second surface of the first shield portion.

16. The system of claim 15, further comprising:
   a hood support bracket coupled to a surface of the hood shield plate, the surface of the hood shield plate facing a rear surface of the post-processing device; and
   wherein the hood is coupled to the hood shield plate via the hood support bracket.

17. The system of claim 15, wherein a rear surface of the hood shield plate is defined by the first shield portion, the second shield portion, and the third shield portion.

18. The system according to claim 14, further comprising:
   a traveling machine body having a front portion in which the engine is installed; and
   wherein the hood shield plate is disposed on a rear side of the hood and configured to cover at least a rear surface of the post-processing device.

* * * * *